United States Patent
Sun et al.

(10) Patent No.: US 11,497,096 B2
(45) Date of Patent: Nov. 8, 2022

(54) SOURCE DRIVER, DRIVING SYSTEM, LIQUID CRYSTAL DISPLAY DEVICE AND CORRECTION METHOD THEREFOR

(71) Applicants: HEFEI BOE DISPLAY TECHNOLOGY CO., LTD., Anhui (CN); BOE TECHNOLOGY GROUP CO., LTD., Beijing (CN)

(72) Inventors: Jianwei Sun, Beijing (CN); Liugang Zhou, Beijing (CN); Ke Dai, Beijing (CN); Yizhan Han, Beijing (CN); Yulong Xiong, Beijing (CN); Tao Li, Beijing (CN); Xiaofeng Yin, Beijing (CN); Maoyang Zhu, Beijing (CN); Pengjun Fang, Beijing (CN)

(73) Assignees: HEFEI BOE DISPLAY TECHNOLOGY CO., LTD., Anhui (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 175 days.

(21) Appl. No.: 16/990,768

(22) Filed: Aug. 11, 2020

(65) Prior Publication Data

US 2021/0051780 A1 Feb. 18, 2021

(30) Foreign Application Priority Data

Aug. 12, 2019 (CN) .......................... 201910741188.8

(51) Int. Cl.
*G02F 1/1345* (2006.01)
*H05B 45/325* (2020.01)
*G02F 1/1362* (2006.01)
(52) U.S. Cl.
CPC ....... *H05B 45/325* (2020.01); *G02F 1/13452* (2013.01); *G02F 1/136286* (2013.01)

(58) Field of Classification Search
CPC .................................................. G02F 1/13452
See application file for complete search history.

(56) References Cited

U.S. PATENT DOCUMENTS

2007/0279364 A1 12/2007 Moh
2011/0001749 A1 1/2011 Min et al.
(Continued)

FOREIGN PATENT DOCUMENTS

CN 101944337 A 1/2011
CN 102376275 A 3/2012
(Continued)

OTHER PUBLICATIONS

Office Action dated Jan. 13, 2022 in CN Patent Application No. 201910741188.8, 14 total pages.

*Primary Examiner* — Sang V Nguyen
(74) *Attorney, Agent, or Firm* — Procopio, Cory, Hargreaves & Savitch LLP

(57) ABSTRACT

A source driver includes at least one data input terminal, a plurality of data output terminals, at least two control terminals and a plurality of source driving circuits. Each source driving circuit is connected to a data input terminal of the at least one data input terminal, a data output terminal of the plurality of data output terminals and the at least two control terminals. The source driving circuit is configured such that: the source driving circuit converts a format of a data signal from the data input terminal; and in response to one of different control signals that is received by all the at least two control terminals, the source driving circuit has a corresponding different output impedance, and transmits the converted data signal to the data output terminal.

15 Claims, 16 Drawing Sheets

(56) References Cited

U.S. PATENT DOCUMENTS

2011/0141098 A1* 6/2011 Yaguma .............. G09G 3/3696
                                                                               345/212
2020/0005725 A1    1/2020  Gao

FOREIGN PATENT DOCUMENTS

| CN | 105304049 A |   | 2/2016  |           |
|----|-------------|---|---------|-----------|
| CN | 107274847   | * | 10/2017 | G09G 3/36 |
| CN | 107274847 A |   | 10/2017 |           |
| CN | 107978291 A |   | 5/2018  |           |
| CN | 108630165 A |   | 10/2018 |           |

* cited by examiner

SOURCE DRIVER, DRIVING SYSTEM, LIQUID CRYSTAL DISPLAY DEVICE AND CORRECTION METHOD THEREFOR

CROSS-REFERENCE TO RELATED APPLICATION

This application claims priority to Chinese Patent Application No. 201910741188.8, filed Aug. 12, 2019, which is incorporated herein by reference in its entirety.

TECHNICAL FIELD

The present disclosure relates to the field of display technologies, and in particular, to a source driver, a driving system, a liquid crystal display device and a correction method therefor.

BACKGROUND

Liquid crystal display (LCD) devices have been widely used in society due to their small size, low power consumption, no radiation, and relatively low manufacturing costs.

SUMMARY

In an aspect, a source driver is provided. The source driver includes at least one data input terminal, a plurality of data output terminals, at least two control terminals and a plurality of source driving circuits. Each source driving circuit is connected to a data input terminal of the at least one data input terminal, a data output terminal of the plurality of data output terminals and the at least two control terminals. The source driving circuit is configured such that: the source driving circuit converts a format of a data signal from the data input terminal; and in response to one of different control signals that is received by all the at least two control terminals, the source driving circuit has a corresponding different output impedance, and transmits the converted data signal to the data output terminal.

In some embodiments, the source driving circuit is configured to in response to different control signals received by the at least two control terminals, an output impedance of the data output terminal is different, which includes that, in response to a first control signal received by the at least two control terminals, the source driving circuit is configured to make the output impedance of the data output terminal be a first impedance. In response to a second control signal received by the at least two control terminal, the output impedance of the data output terminal is a second impedance; and the second impedance is greater than the first impedance.

In some embodiments, the source driving circuit includes a data conversion circuit and an impedance adjustment circuit. The data conversion circuit is configured to convert the format of the data signal, and transmit the converted data signal to an impedance adjustment circuit. The impedance adjustment circuit is connected to the data conversion circuit, the at least two control terminals, and the data output terminal. The impedance adjustment circuit is configured such that; in response to the first control signal, the impedance adjustment circuit has the first output impedance, and transmits the converted data signal to the data output terminal; and in response to the second control signal, the impedance adjustment circuit has the second output impedance, and transmits the converted data signal to the data output terminal.

In some embodiments, the at least two control terminals include 2N control terminals, the 2N control terminals are divided into N groups of control terminals, each group of control terminals includes two control terminals, and N is an integer that is greater than or equal to two. The impedance adjustment circuit includes a first impedance adjustment sub-circuit and ($2^N-1$) second impedance adjustment sub-circuits. The first impedance adjustment sub-circuit is connected to the data conversion circuit, the data output terminal, and one control terminal of each group of control terminals. The first impedance adjustment sub-circuit is configured to, in response to the first control signal, transmit the converted data signal from the data conversion circuit to the data output terminal, so that an output impedance of the source driving circuit is the first output impedance. The ($2^N-1$) second impedance adjustment sub-circuits corresponds to different second impedances. Each second impedance adjustment sub-circuit is connected to the data conversion circuit, the data output terminal, and one control terminal in each group of control terminals. The second impedance adjustment sub-circuits is configured to, in response to the second control signal, transmit the converted data signal from the data conversion circuit to the data output terminal, so that the output impedance of the source driving circuit is a corresponding second output impedance. Control terminals connected to any two of the first impedance adjustment sub-circuit and the ($2^N-1$) second impedance adjustment sub-circuits are not completely same control terminals.

In some embodiments, the first impedance adjustment sub-circuit includes N first switching transistors connected in series. A gate of each first switching transistor is connected to one control terminal in a corresponding group of control terminals, and the N first switching transistors are connected to the data conversion circuit and the data output terminal. Each second impedance adjustment sub-circuit includes N second switching transistors and a resistor that are connected in series. A gate of each second switching transistor is connected to one control terminal in a corresponding group of control terminals, and a first electrode of a first second switching transistor in the N second switching transistors is connected to the data conversion circuit. One terminal of the resistor is connected to a second electrode of an Nth second switching transistor in the N second switching transistors, and another terminal of the resistor is connected to the data output terminal. Resistance values of resistors in any two of the N second impedance adjustment sub-circuits are different.

In some embodiments, the source driver further includes N control signal input terminals and N control signal conversion units. Each control signal conversion unit includes an inverter. One terminal of the inverter is connected to a corresponding control signal input terminal, and another terminal of the inverter is connected to a control terminal in a corresponding group of control terminals; and another control terminal of the corresponding group of control terminals is directly connected to the corresponding control signal input terminal.

In some embodiments, the data conversion circuit includes a digital-to-analog converter and an amplifier. The digital-to-analog converter is connected to the data input terminal, the digital-to-analog converter is configured to convert a digital signal from the data input terminal into an analog voltage signal. The amplifier is connected to the digital-to-analog converter and the impedance adjustment circuit, the amplifier is configured to amplify the analog voltage signal, and transmit the amplified analog voltage signal to the impedance adjustment circuit.

In another aspect, a driving system is provided. The driving system includes at least one source driver as described above and a timing controller. The timing controller includes a control circuit. The control circuit is connected to at least one data input terminal and at least two control terminals of each source driver. The control circuit is configured to output the data signal to the at least one data input terminal; and output one of the different control signals to the at least two control terminals according to a pulse width modulation signal.

In some embodiments, the control circuit is configured to: in response to the pulse width modulation signal that is at a high level, output a first control signal to the at least two control terminals; and in response to the pulse width modulation signal that is at a low level, output one of at least one second control signal to the at least two control terminals.

In some embodiments, the at least two control terminals include 2N control terminals; the 2N control terminals are divided into N groups of control terminals, and each group of control terminals includes 2 control terminals, and N is an integer that is greater than or equal to two. The source driving circuit of the source driver includes a data conversion circuit and an impedance adjustment circuit. The impedance adjustment circuit includes a first impedance adjustment sub-circuit and ($2^N-1$) second impedance adjustment sub-circuits. The control circuit is configured to: in response to the pulse width modulation signal that is at the high level, output the first control signal to the 2N control terminals to enable the first impedance adjustment sub-circuit to be turned on; and in response to the pulse width modulation signal that is at the low level, output a second control signal to the 2N control terminals to enable one of the ($2^N-1$) second impedance adjustment sub-circuits to be turned on.

In some embodiments, the timing controller further includes a memory connected to the control circuit. The memory is configured to store the data signal and the different control signals. The different control signals include the first control signal and at least one second control signal. The control circuit is further configured to: retrieve the data signal from the memory and output the data signal to the at least one data input terminal; in response to the pulse width modulation signal that is at the high level, retrieve the first control signal from the memory and output the first control signal to the at least two control terminals; and in response to the pulse width modulation signal that is at the low level, retrieve one of the at least one second control signal from the memory and output the one of the at least one second control signal to the at least two control terminals.

In some embodiments, the memory is further configured to store at least one corresponding relationship between luminance of a backlight module and the at least one second control signal. The control circuit is further configured to, in response to the pulse width modulation signal that is at the low level: obtain luminance of the backlight module corresponding to the pulse width modulation signal; according to the pulse width modulation signal and the at least one corresponding relationship, retrieve a second control signal corresponding to the luminance of the backlight module from the memory; and output the second control signal to the at least two control terminals.

In another aspect, a liquid crystal display device is provided. The liquid crystal display device includes a liquid crystal display panel, the driving system as described above, a system-on-a-chip and a backlight module. The liquid crystal display panel includes a plurality of data lines, each data line is connected to a source driving circuit in a source driver of the driving system. The system-on-a-chip is connected to the timing controller of the driving system. The system-on-a-chip is configured to output the pulse width modulation signal to the timing controller and a backlight driving circuit of a backlight module. The backlight module includes the backlight driving circuit and at least one light source connected to the backlight driving circuit. The backlight driving circuit is connected to the system-on-a-chip, and is configured to receive the pulse width modulation signal, and drive the at least one light source to emit light according to the pulse width modulation signal.

In some embodiments, the at least one source driver in the driving system is disposed in a peripheral area on the liquid crystal display panel. The liquid crystal display device further includes: a first circuit board, on which the timing controller is disposed; and a first flexible circuit board, through which the liquid crystal display panel and the first circuit board are connected.

In some embodiments, the liquid crystal display device further includes: a second flexible circuit board, on which the at least one source driver is disposed; and a second circuit board, on which the timing controller is disposed; and the liquid crystal display panel and the second circuit board being connected through the second flexible circuit board.

In yet another aspect, a correction method for the liquid crystal display device is provided. The correction method includes: receiving, by the timing controller, the pulse width modulation signal output by the system-on-a-chip; in response to the pulse width modulation signal that is at a high level, outputting, by the timing controller, a first control signal to the at least two control terminals, so that an output impedance of the source driving circuit of the source driver is a first output impedance; and in response to the pulse width modulation signal that is at a low level, outputting, by the timing controller, one of at least one second control signal to the at least two control terminals, so that the output impedance of the source driving circuit of the source driver is a corresponding second output impedance.

In some embodiments, the source driving circuit of the source driver includes 2N control terminals. The 2N control terminals are divided into N groups of control terminals, and each group of control terminals includes 2 control terminals, and N is an integer that is greater than or equal to two. The source driving circuit of the source driver includes a data conversion circuit and an impedance adjustment circuit. The impedance adjustment circuit includes a first impedance adjustment sub-circuit and ($2^N-1$) second impedance adjustment sub-circuits. In response to the pulse width modulation signal that is at the high level, outputting, by the timing controller, the first control signal to the at least two control terminals, includes: outputting, by the timing controller, the first control signal to the 2N control terminals to enable the first impedance adjustment sub-circuit to be turned on.

In some embodiments, the first impedance adjustment sub-circuit includes N first switching transistors that are connected in series. Outputting, by the timing controller, the first control signal to the 2N control terminals to enable the first impedance adjustment sub-circuit to be turned on, includes: outputting, by the timing controller, the first control signal to the 2N control terminals to turn on the N first switching transistors in the first impedance adjustment sub-circuit.

In some embodiments, the source driving circuit of the source driver includes 2N control terminals. The 2N control terminals are divided into N groups of control terminals, each group of control terminals includes 2 control terminals, and N is an integer that is greater than or equal to two, the source driving circuit of the source driver includes a data conversion circuit and an impedance adjustment circuit, the impedance adjustment circuit includes a first impedance adjustment sub-circuit and ($2^N$–1) second impedance adjustment sub-circuits. In response to the pulse width modulation signal that is at the low level, outputting, by the timing controller, the one of the at least one second control signal to the at least two control terminals, so that the output impedance of the source driving circuit of the source driver is the corresponding second output impedance, includes: obtaining, by the timing controller, luminance of a backlight module corresponding to the pulse width modulation signal; outputting, by the timing controller, a second control signal corresponding to the luminance of the backlight module to the 2N control terminals to enable a corresponding one of the ($2^N$–1) second impedance adjustment sub-circuits to be turned on, so that the output impedance of the source driving circuit is a second output impedance corresponding to the turned-on second impedance adjustment sub-circuit.

In some embodiments, each of the ($2^N$–1) second impedance adjustment sub-circuits includes N second switching transistors and a resistor that are connected in series. Outputting, by the timing controller, the second control signal corresponding to the luminance of the backlight module to the 2N control terminals to enable the corresponding one of the ($2^N$–1) second impedance adjustment sub-circuits to be turned on, includes: outputting, by the timing controller, the second control signal corresponding to the luminance of the backlight module to the 2N control terminals to turn on N second switching transistors in the corresponding one of the ($2^N$–1) second impedance adjustment sub-circuits.

BRIEF DESCRIPTION OF THE DRAWINGS

In order to describe technical solutions in embodiments of the present disclosure more clearly, accompanying drawings to be used in some embodiments of the present disclosure will be introduced briefly. However, the accompanying drawings to be described below are merely some embodiments of the present disclosure, and a person of ordinary skill in the art can obtain other drawings according to these drawings without paying any creative effort. In addition, the accompanying drawings in the following description may be regarded as schematic diagrams, and are not limitations on an actual size of a product, an actual process of a method and an actual timing of signals that the embodiments of the present disclosure relate to.

DETAILED DESCRIPTION

Figure 1:
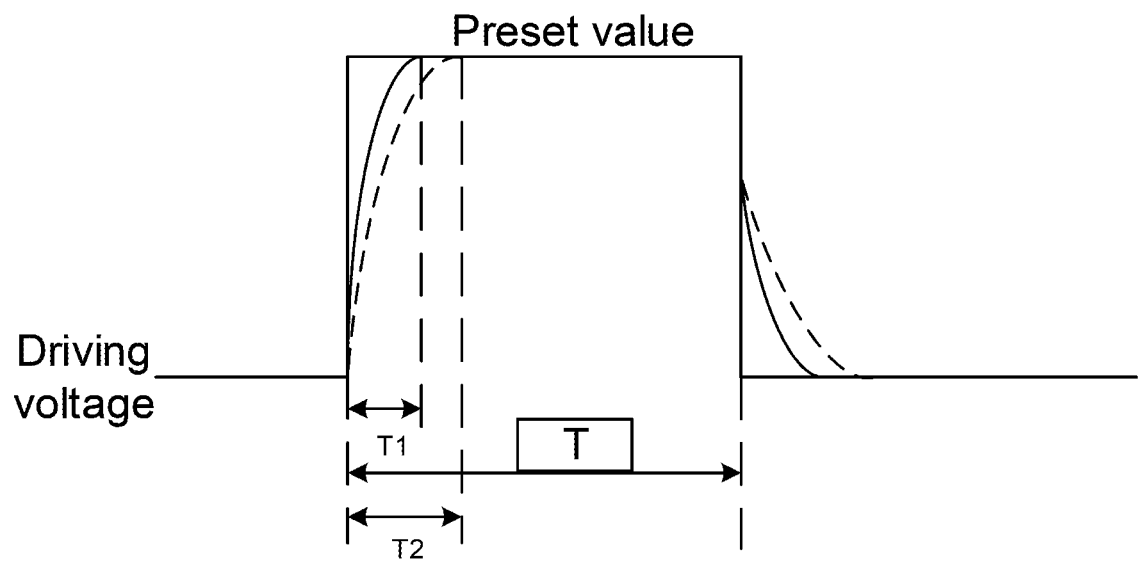
FIG. 1 is a schematic diagram showing time taken for a driving voltage of a sub-pixel to rise to a preset value.

Technical solutions in some embodiments of the present disclosure will be described clearly and completely with reference to accompanying drawings below. Obviously, the described embodiments are merely some but not all of the embodiments of the present disclosure. All other embodiments obtained on a basis of the embodiments of the present disclosure by a person of ordinary skill in the art without paying any creative effort shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "inclusive, but not limited to". In the description, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials or characteristics may be included in any one or more embodiments or examples in any suitable manner.

Terms such as "first" and "second" are used for descriptive purposes only and are not to be construed as indicating or implying the relative importance or implicitly indicating the number of indicated technical features below. Therefore, features defined by the term "first" or "second" may include one or more of the features, either explicitly or implicitly. In the description of the embodiments of the present disclosure, the term "plurality of" means two or more unless otherwise specified.

In the description of some embodiments, the terms "connected" and the like should be broadly understood unless expressly stated and limited otherwise. For example, they can be construed as fixedly connected or detachably connected or integrally connected. They can be mechanically connected or electrically connected and can be directly connected or indirectly connected through an intermediate medium. There can also be an internal connection between two elements. A person of ordinary skill in the art would understand the specific meaning of the terms in specific situations.

It will also be understood that when a layer or element is referred to as being "on" another layer or substrate, it can be directly on the other layer or substrate, or intervening layers may also be present.

"Approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Expressions such as "applicable to" or "configured to" are construed as an open and inclusive meaning, which does not exclude devices that are applicable to or configured to perform additional tasks or steps.

"A and/or B" includes the following combinations of A and B: only A, only B, and a combination of A and B.

A liquid crystal display (LCD) device includes a liquid crystal display panel and a backlight module. The backlight module includes light sources for providing light to the liquid crystal display panel. The liquid crystal display panel includes a plurality of thin film transistors (TFT) and a plurality of pixel electrodes each connected to a corresponding TFT. The TFT includes an active layer. When the light emitted from the light source reaches the active layer, photo-generated carriers are generated in the active layer, and the characteristics of the active layer may be affected, resulting in an increase of an impedance of the active layer.

In this case, as shown in FIG. 1, the actual charging time for the pixel electrode with light may be shorter than the actual charging time for the pixel electrode without light, wherein the actual charging time for the sub-pixel without light is a difference between T and T1; an actual charging time for the sub-pixel with light is a difference between T and T2; T is a preset charging time for the pixel electrode; T1 is a time taken for a driving voltage of the sub-pixel to rise to a preset voltage (a voltage at which the sub-pixel can start charging) without light; and T2 is a time taken for the driving voltage of the sub-pixel to rise to the preset voltage with light. That is, charging rates of the pixel electrode may be different when there is light and no light.

Figure 2:
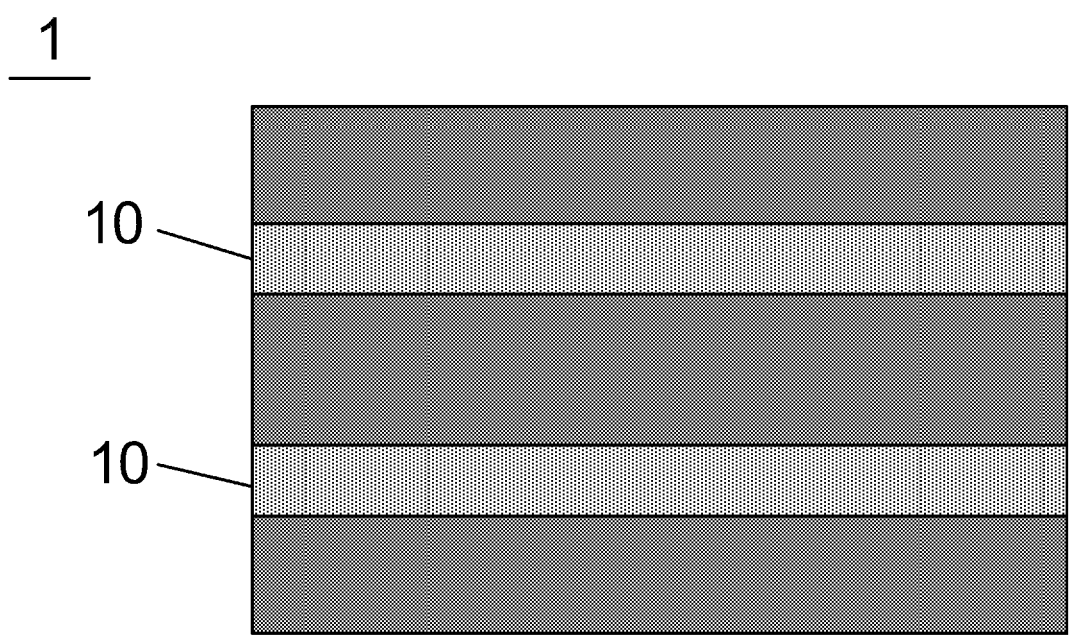
FIG. 2 is a schematic diagram showing a water fall defect in a monochrome image.

In the liquid crystal display device, different charging rates of pixel electrodes may result in different deflection angles of the liquid crystal molecules and different display luminance of the display device. For example, as shown in FIG. 2, when the liquid crystal display device displays an image, a moving or static horizontal stripe pattern 10 (may referred to as a waterfall defect) may appear, which may cause a poor display effect of the liquid crystal display device. In addition, when the liquid crystal display device display a monochrome image, the water fall defect may be more obvious.

Figure 3A:
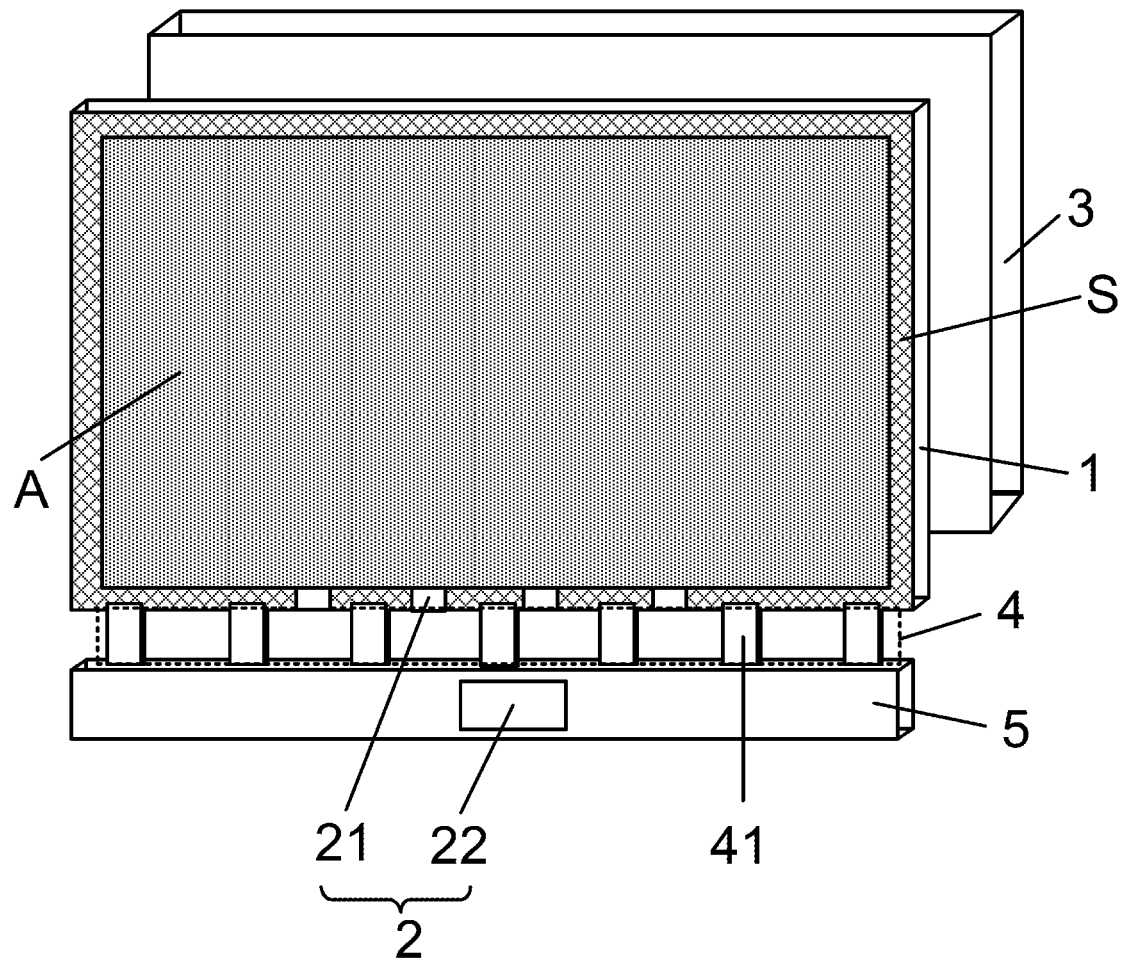
FIG. 3A is a schematic diagram showing a structure of a liquid crystal display device, according to some embodiments.
Figure 3B:
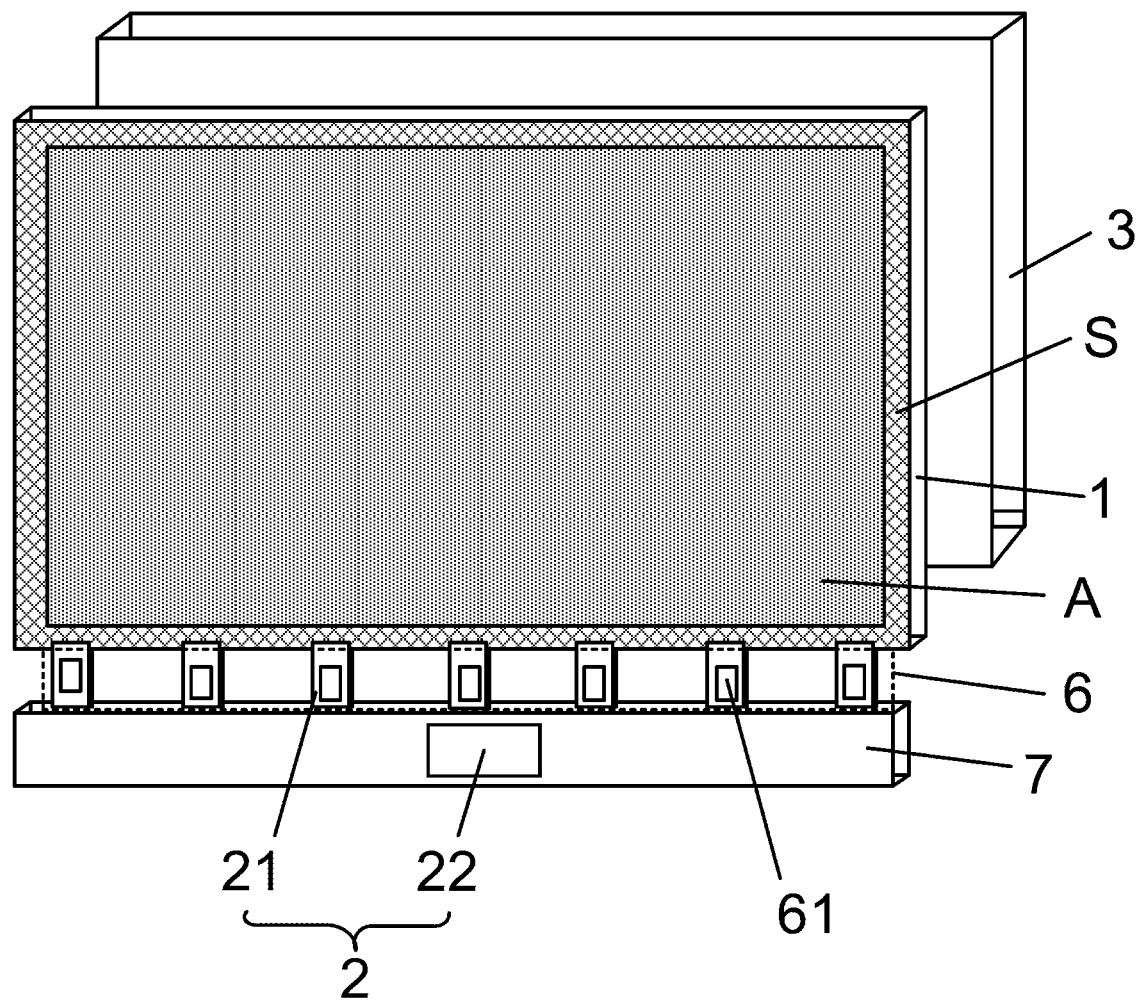
FIG. 3B is a schematic diagram showing a structure of another liquid crystal display device, according to some embodiments.
Figure 3C:
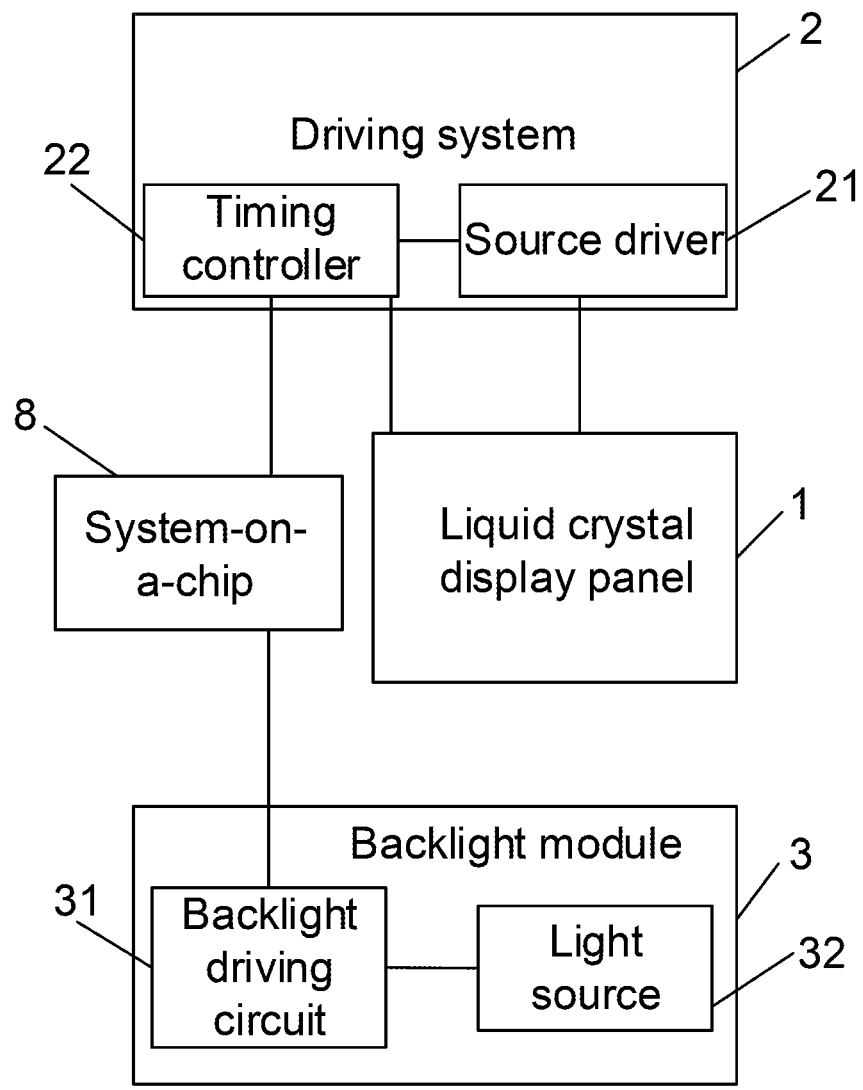
FIG. 3C is a block diagram of a liquid crystal display device, according to some embodiments.

As shown in FIGS. 3A to 3C, some embodiments of the present disclosure provide a liquid crystal display device. The liquid crystal display device includes a liquid crystal display panel 1, a driving system 2, a system-on-a-chip 8 and a backlight module 3. As shown in FIG. 3C, the driving system 2 is electrically connected to the liquid display panel 1 and the backlight module 3, and the liquid display panel 1 is mechanically connected to the backlight module 3.

It will be noted that the liquid crystal display device provided may be any device that displays moving images (e.g., video) or stationary images (e.g., static images) and text or pictures. It is contemplated that the embodiments may be implemented in or associated with various electronic devices. The various electronic devices include, but not limited to, mobile phones, wireless devices, portable android devices (PADs), handheld or portable computers, global positioning system (GPS) receivers/navigators, cameras, MPEG-4 Part 14 (MP4) video players, video cameras, game consoles, watches, clocks, calculators, TV monitors, flat panel displays, computer monitors, vehicle displays (e.g., odometer displays, etc.), navigators, cabin controllers and/or displays, camera view displays (e.g., displays for rear cameras in vehicles), electronic photos, electronic billboards or indicators, projectors, building structures, packaging and aesthetic structures (e.g., displays for displaying images of a piece of jewelry), etc.

Figure 4A:
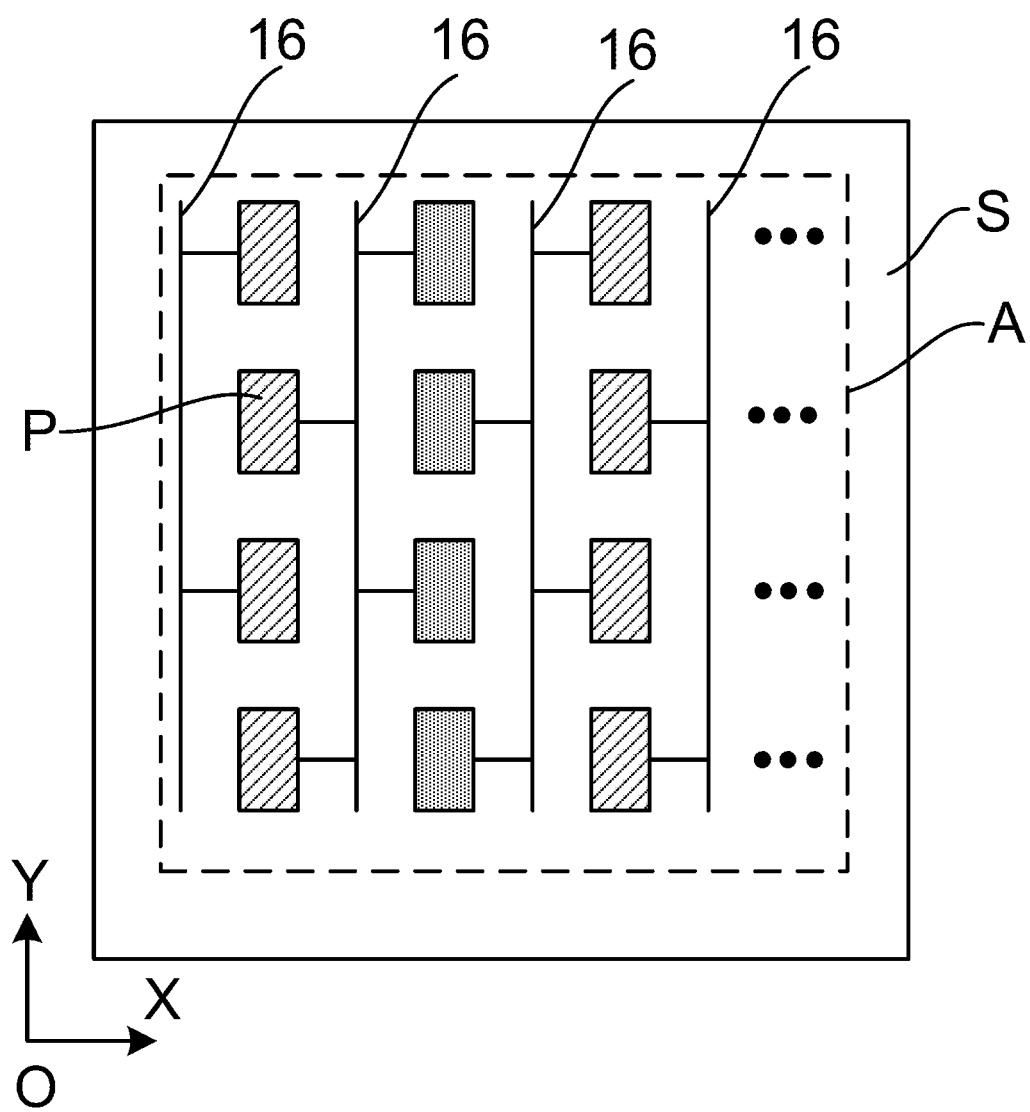
FIG. 4A is a schematic top view of a liquid crystal display panel, according to some embodiments.

In some embodiments, as shown in FIG. 4A, the liquid crystal display panel 1 has a display area A and a peripheral area S, and the peripheral area S is arranged on at least one side of the display area A. For example, the peripheral area S is arranged on all sides of the display area A. That is, the peripheral area S surrounds the display area A. For another example, the peripheral area S is arranged on two opposite sides of the display area A.

The peripheral area S may be used for wiring. In addition, the peripheral area S may be provided with a driving circuit (such as a gate driver) therein.

As shown in FIG. 4A, the display area A includes a plurality of sub-pixel regions P. The plurality of sub-pixel regions P include first color sub-pixel regions, second color sub-pixel regions and third color sub-pixel regions. The first color, the second color and the third color may be three primary colors (for example, red, green and blue, respectively).

In some examples, as shown in FIG. 4A, the sub-pixel regions P are arranged in an array. In this case, sub-pixel regions P arranged in a row along a horizontal direction OX are referred to as a row of sub-pixel regions P, and sub-pixel regions P arranged in a column along a vertical direction OY are referred to as a column of sub-pixel regions P.

Figure 4B:
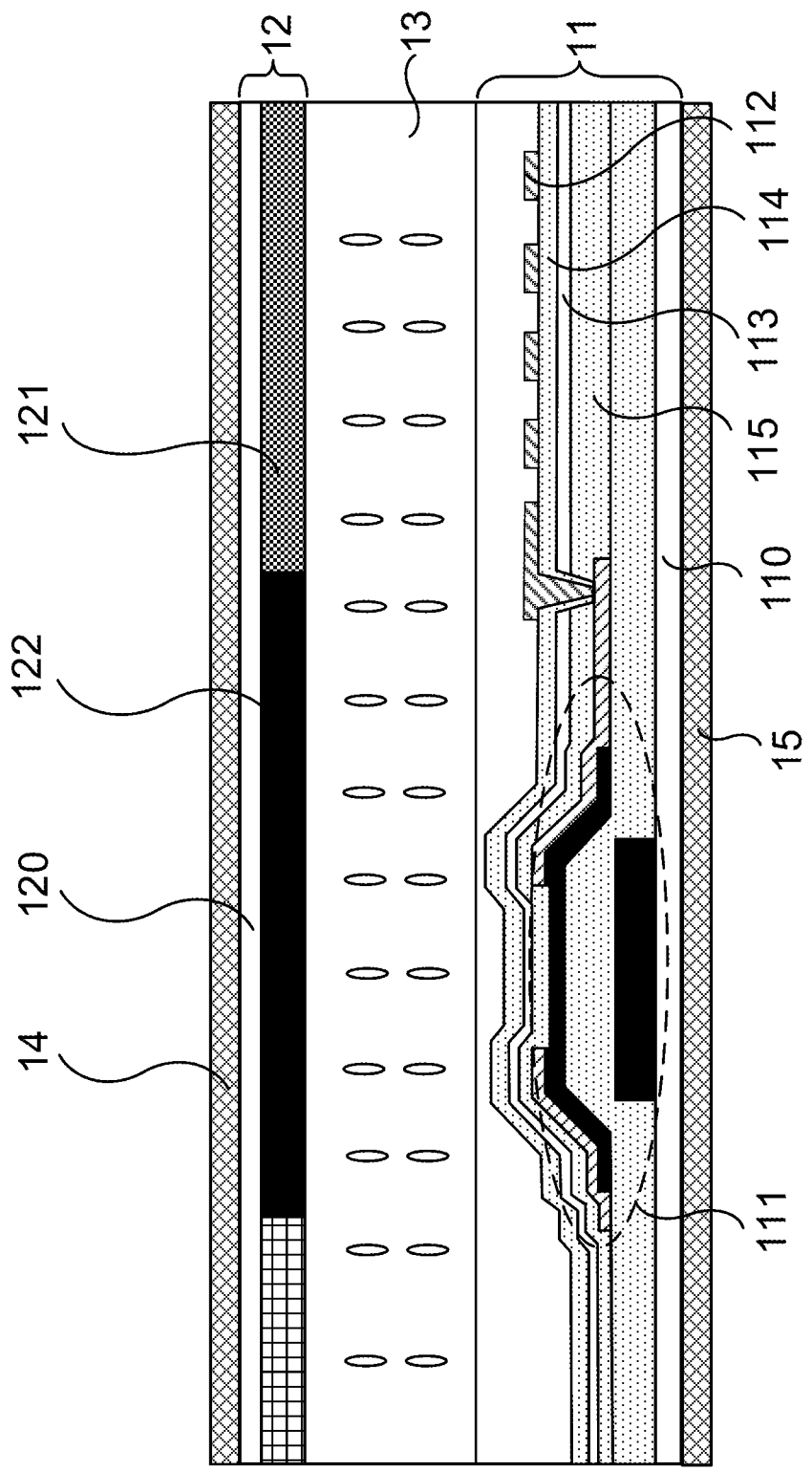
FIG. 4B is a section of a liquid crystal display panel, according to some embodiments.

In some embodiments, as shown in FIG. 4B, the liquid crystal display panel 1 includes an array substrate 11, an opposite substrate 12, and a liquid crystal layer 13 disposed between the array substrate 11 and the opposite substrate 12.

As shown in FIG. 4B, the array substrate 11 includes a first base 110, and a plurality of pixel driving circuit and pixel electrodes 112 that are disposed on the first base 110.

As shown in FIG. 4A, the array substrate 11 further includes a plurality of data lines 16 disposed on the first base 110. In some examples, the pixel driving circuits in sub-pixel regions P in odd rows and a column and the pixel driving circuits in sub-pixel regions P in even rows and an adjacent column may be connected to a same data line 16. In some other examples, the pixel driving circuits in sub-pixel regions P in a same column are connected to a data line 16.

As shown in FIG. 4B, the pixel driving circuit includes at least one TFT 111, and the TFT 111 includes an active layer, a source, a drain, a gate and a portion of a gate insulating layer. The source and the drain are in contact with the active layer. In a case where the TFT 111 is a P-type TFT, the pixel electrode 112 is electrically connected to the drain of the TFT 111, and the source of the TFT 111 is electrically connected to a corresponding data line 16. Alternatively, in a case where the TFT 111 is an N-type TFT, the pixel electrode 112 is electrically connected to the source of the TFT 111, and the drain of the TFT 111 is electrically connected to the corresponding data line 16.

In some embodiments, as shown in FIG. 4B, the array substrate 11 further includes a common electrode 113 disposed on the first base 110.

In some examples, the pixel electrodes 112 and the common electrode 113 are disposed in a same layer. In this case, the pixel electrode 112 and the common electrode 113 both have comb structures and include a plurality of strip-shaped sub-electrodes.

In some other examples, the pixel electrode 112 and the common electrode 113 are disposed in different layers. In this case, as shown in FIG. 4B, the array substrate 11 further includes a first insulating layer 114 disposed between the pixel electrodes 112 and the common electrode 113.

For example, as shown in FIG. 4B, the common electrode 113 is disposed between the TFTs 111 and the pixel electrodes 112, and the array substrate 11 further includes a second insulating layer 115 disposed between the common electrode 113 and the TFTs 111.

In some other embodiments, the common electrode 113 is included in the opposite substrate 12.

As shown in FIG. 4B, the opposite substrate 12 includes a second base 120, and a color filter layer 121 and a black matrix 122 that are disposed on the second base 120. In this case, the opposite substrate 12 may also be referred to as a color filter (CF) substrate. The color filter layer 121 includes at least red color filter units, green color filter units and blue color filter units. The red color filter units, the green color filter units and the blue color filter units are each disposed in a corresponding sub-pixel region P. The black matrix 122 is disposed between adjacent color filter units, and is used to block light from reaching the liquid crystal molecules in the liquid crystal layer 13 that are not controlled currently, and make the red color filter units, the green color filter units, and the blue color filter units be spaced apart.

It will be understood that the first base 110 and the second base 120 described above may be bases made of glass, polyimide (PI) or other materials that can be used to form the bases.

As shown in FIG. 4B, the liquid crystal display panel 1 further includes an upper polarizer 14 disposed on a surface of the opposite substrate 12 facing away from the liquid crystal layer 13 and a lower polarizer 15 disposed on a surface of the array substrate 11 facing away from the liquid crystal layer 13.

In some embodiments, the system-on-a-chip 8 is connected to the driving system 2 and the backlight module 3. The system-on-a-chip 8 can provide a pulse width modulation (PWM) signal to the driving system 2 and the backlight module 3. The system-on-a-chip 6 may be an integrated circuit.

In some embodiments, as shown in FIG. 3C, the backlight module 3 includes a backlight driver circuit 31 and at least one light source 32 electrically connected to the backlight driver circuit 31. The backlight driver circuit 31 is electrically connected to the system-on-a-chip 8. The backlight driver circuit 31 is configured to receive the PWM signal output by the system-on-a-chip 8, and drive the at least one light source to emit light according to the PWM signal, so as to control the at least one light source 32 to alternate between on and off. For example, the light source 32 includes a plurality of light-emitting diodes (LEDs).

The PWM signal are rectangular waves, varying from a low voltage level to a high voltage level. The light source alternates between on and off at a certain frequency under control of the PWM signal. For example, in a case where the PWM signal is at a low level, the light source is in an off state and thus does not emit light; in a case where the PWM signal is at a high level, the light source is in an on state and thus emits light.

Figure 5A:
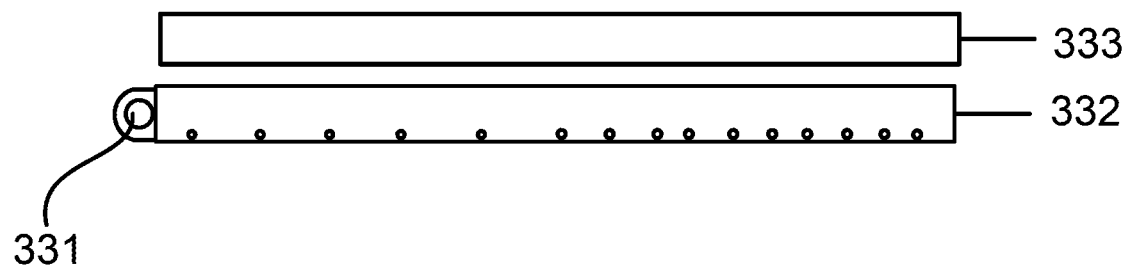
FIG. 5A is a schematic diagram showing a structure of an edge-lit backlight module, according to some embodiments.
Figure 5B:
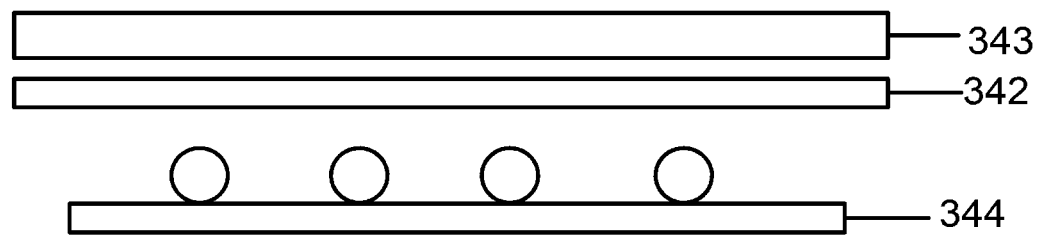
FIG. 5B is a schematic diagram showing a structure of a back-lit backlight module, according to some embodiments.

With reference to FIGS. 5A and 5B, the backlight module 3 may be an edge-lit backlight module 33 or a back-lit backlight module 34.

In some embodiments, as shown in FIG. 5A, the edge-lit backlight module 33 includes a light bar 331, a first light guide plate 332, and a first optical film 333 disposed on a light exit surface of the first light guide plate 332. The light bar 331 includes the backlight driver circuit 31 and the at least one light source 32.

In some examples, the first optical film 313 includes a diffusion sheet and/or at least one brightness enhancement film (BEF). For example, the at least one brightness enhancement film includes a prism film and/or a dual brightness enhancement film (DBEF).

In some other embodiments, as shown in FIG. 5B, the back-lit backlight module 34 includes a light board 344, and a light exit surface of the light board 344 faces the liquid crystal display panel 1. The light board 344 includes the light source 32 and the backlight driver circuit 31. The light source 32 includes the plurality of LEDs arranged in an array and connected to the backlight driver circuit 31.

As shown in FIG. 5B, the back-lit backlight module 34 further includes a second light guide plate 342 and a second optical film 343 disposed on a light exit surface of the second light guide plate 342. With regard to the second optical film 343, reference may be made to the first optical film 313.

The driving system 2 is configured to drive the liquid crystal display panel 1 to display images. As shown in FIG. 3C, the driving system 2 includes a timing controller 22, and at least one source driver 21 connected to the timing controller 22. The at least one source driver 21 is further connected to the plurality of data lines 16 in the liquid crystal display panel 1. For example, the at least one source driver 21 includes one source driver 21, and the source driver 21 is connected to the plurality of data lines 16. For another example, the at least one source driver 21 includes a plurality of source drivers 21, and each source driver 21 is connected to part of the plurality of data lines 16.

In some embodiments, as shown in FIG. 3A, the liquid crystal display device further includes a first circuit board 5 and a first flexible printed circuit board 4. The liquid crystal display panel 1 and the first circuit board 5 are connected through the first flexible printed circuit board 4. For example, the first flexible printed circuit board 4 includes a plurality of first flexible printed circuit boards 41. The at least one source driver 21 is disposed in the peripheral area S on the liquid crystal display panel 1. The timing controller 22 is disposed on the first circuit board 5.

In some other embodiments, as shown in FIG. 3B, the liquid crystal display device further includes a second flexible printed circuit board 6 and a second circuit board 7. An end of the second flexible printed circuit board 6 is bonded to the peripheral area S of the liquid crystal display panel 1, and an opposite end of the second flexible printed circuit board 6 is connected to the second circuit board 7. The at least one source driver 21 is disposed on the second flexible printed circuit board 6, and the timing controller 22 is disposed on the second circuit board 7. For example, the second flexible circuit board 6 includes a plurality of second flexible printed circuit boards 61, the at least one source driver 21 includes a plurality of source drivers 21, and each source driver 21 is disposed on a corresponding second flexible printed circuit board 61.

Figure 6:
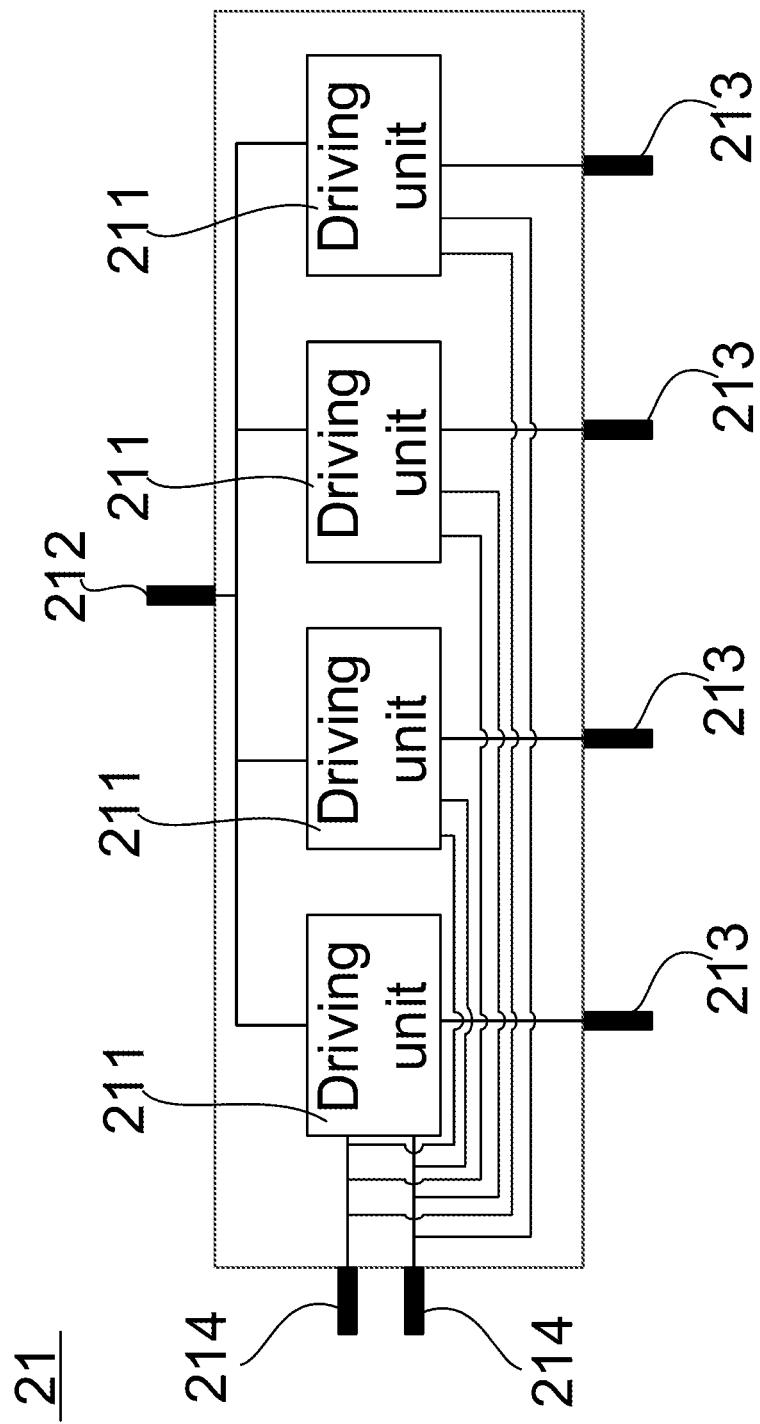
FIG. 6 is a schematic diagram of a source driver, according to some embodiments.

In some embodiments, as shown in FIG. 6, the source driver 21 includes a plurality of source driving circuits 211, at least one data input terminal 212, a plurality of data output terminals 213, and at least two control terminals 214.

At least one source driving circuit 211 is connected to a data input terminal 212, a data output terminal 213 and the at least two control terminals 214. For example, each source driving circuit 211 is connected to a data input terminal 212, a respective one of the plurality of data output terminals 213 and the at least two control terminals 214.

For example, the source driver 21 includes one data input terminal 212, and each source driving circuit 211 is connected to the data input terminal 212, For another example, the source driver 21 includes a plurality of data input terminals 212, and each source driving circuit 211 is connected to a respective one of the plurality of data input terminals 212.

The source driving circuit 211 is configured that: the source driving circuit 211 converts a format of a data signal, and in response to one of different control signals that is received by all the at least two control terminals 214, the source driving circuit 211 has a corresponding different output impedance, and transmits the converted data signal to the data output terminal 213 connected thereto.

For example, the at least one data input terminal 212 is connected to the timing controller 22, so as to receive the data signal from the timing controller 22.

On this basis, for example, the at least two control terminals 214 are also connected to the timing controller 22, so as to receive the one of the different control signals from the timing controller 22.

In some examples, the different control signals include a first control signal and at least one second control signal. In a case where the control signal from the at least two control terminals 214 is the first control signal, the source driving circuit 211 is configured such that in response to the first control signal, the source driving circuit 211 has a first output impedance (denoted as Z1).

In a case where the control signal from the at least two control terminals 214 is one of the at least one second control signal, the source driving circuit 211 is configured such that in response to the one of the at least one second control signal, the source driving circuit 211 has a second output impedance (denoted as Z2). The second output impedance Z2 is greater than the first output impedance Z1.

It can be understood that in a case where the at least two control terminals 214 are connected to the timing controller 22, the timing controller 22 may output the first control signal or the second control signal to the at least two control terminals 214.

In some embodiments, the number of the plurality of source driving circuits 211 in the source driver 21 is J1, and the number of the data lines 16 in the liquid crystal display panel 1 is K. J1 is greater than or equal to K, and both J1 and K are positive integers. In this case, the driving system 2 may only include one source driver 21.

In some other embodiments, the number of the plurality of source driving circuits 211 in the source driver 21 is J2, and the number of the data lines 16 in the liquid crystal display panel 1 is K. J2 is less than K, and both J2 and K are positive integers. In this case, the driving system 2 may include a plurality of source drivers 21.

Each data line 16 is connected to a respective one of the plurality of data output terminal 213. The data signal output by the source driving circuit 211 is transmitted to the TFT 111 in a corresponding sub-pixel region P via the data line 16, then is transmitted to the pixel electrode 112 via the TFT 111 that is in an on state. The pixel electrode 112 is charged to a certain driving voltage according to the converted data signal such as a voltage signal. Accordingly, the pixel electrode 112 and the common electrode 113 can jointly drive the liquid crystal molecules between them; and thus the sub-pixel region is controlled to display different gray scales.

It may be noted that, the data line 16 connected to the source driving circuit 211 and the TFT 111 connected to the data line 16 are driving loads of the liquid crystal display panel 1. Accordingly, impedance of the data line 16 and TFT 111 is part of impedance of the liquid crystal display panel 1.

It will be understood that, impedance of the active layer in the TFT 111 when illuminated is greater than that when not illuminated. As a result, impedance in the sub-pixel region when illuminated (denoted as ZP1) is greater than impedance in the sub-pixel region when not illuminated (denoted as ZP2).

In the source driver 21 provided in the embodiments of the present disclosure, the output impedance of the source driving circuit 211 may be changed to the first output impedance Z1 that is relatively small when there is light, and is changed to the second output impedance Z2 that is relatively great when there is no light. In this way, a sum of ZP1 and Z1 may be equal to or approximately equal to a sum of ZP2 and Z2. In other words, the driving load of liquid crystal display panel 1 when illuminated may be equal to or approximately equal to the driving load of the liquid crystal display panel 1 when not illuminated, which may make a voltage of the pixel electrode 111 substantially consistent. Accordingly, the charging rates of the pixel electrode 111 when illuminated or not illuminated may be substantially consistent. Therefore, the waterfall defects may be eliminated and the display effect of the liquid crystal display panel 1 may be improved.

The expression that the sum of ZP1 and Z1 may be equal to or approximately equal to the sum of ZP2 and Z2 herein may be understood as that: the sum of ZP1 and Z1 is equal to the sum of ZP2 and Z2, or a difference between the sum of ZP1 and Z1 and the sum of ZP2 and Z2 is within an acceptable difference range, which is determined by a person of ordinary skill in the art according to display effect of the liquid crystal display panel 1.

Figure 7:
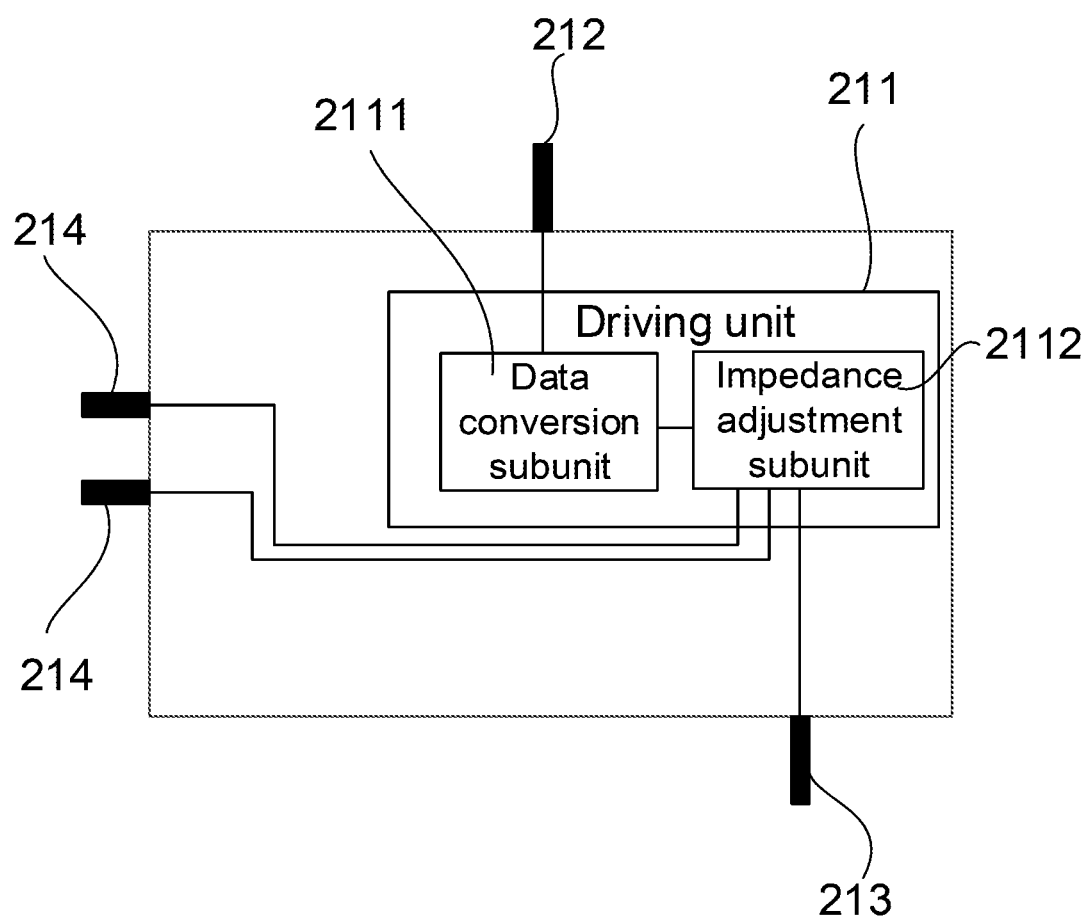
FIG. 7 is a schematic diagram of a source driving circuit, according to some embodiments.

In some embodiments, as shown in FIG. 7, the source driving circuit 211 includes a data conversion circuit 2111 and an impedance adjustment circuit 2112.

The data conversion circuit 2111 is connected to the data input terminal 212. The data conversion circuit 2111 is configured to convert the format of the data signal from the data input terminal 212, and transmit the converted data signal to the impedance adjustment circuit 2112.

The impedance adjustment circuit 2112 is connected to the data conversion circuit 2111, the at least two control terminals 214, and the data output terminal 213. The impedance adjustment circuit 2112 is configured to: in response to the first control signal from the at least two control terminals 214, transmit the converted data signal to the data output terminal 213 with the output impedance of the source driving circuit 211 being the first output impedance Z1; and in response to one of the at least one second control signal from the at least two control terminals 214, transmit the converted data signal to the data output terminal 213 with the output impedance of the source driving circuit 211 being the second output impedance Z2.

In some embodiments, both the first control signal and the at least one second control signal are binary data signals, and number of bits of each binary data signal is consistent with the number of the at least two control terminals. In this case, each control terminal 214 receives any one of binary data "1" and "0".

In some embodiments, the at least two control terminals 214 include two control terminals 214, and both the first control signal and the second control signal are two-digit binary data signals. In other words, the first control signal and the second control signal may be any two of "11", "10", "00", and "01".

In some examples, the two control terminals 214 include a first control terminal and a second control terminal. For example, if the first control signal is "11", then the first control terminal receives a signal "1", and the second control terminal receives a signal "1", For another example, if the second control signal is "10", then the first control terminal receives a signal "1" and the second control terminal receives a signal "0". Of course, it is also possible that the second control signal is "00" or "01".

Figure 8A:
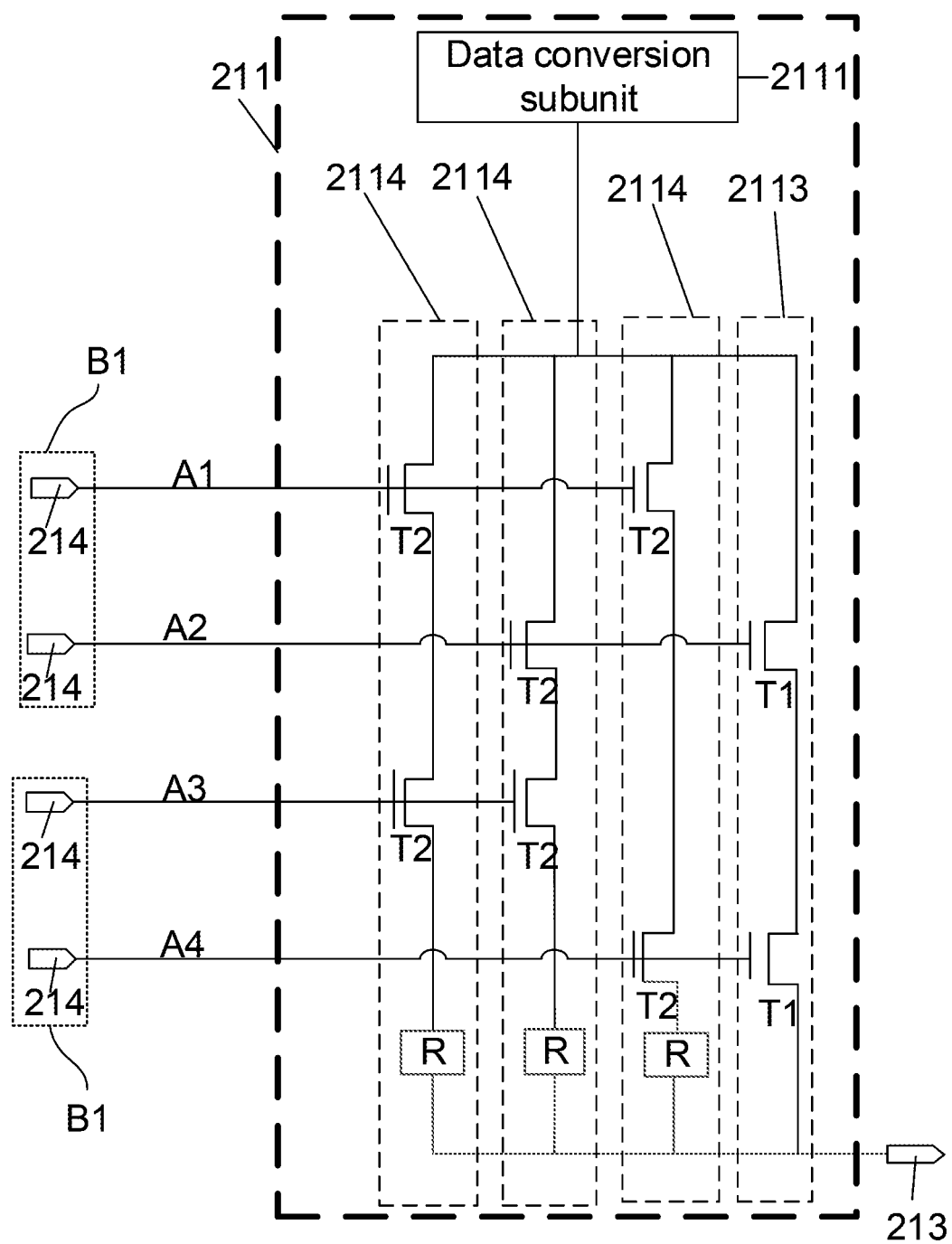
FIG. 8A is a schematic diagram showing a structure of a source driving circuit, according to some embodiments.
Figure 8B:
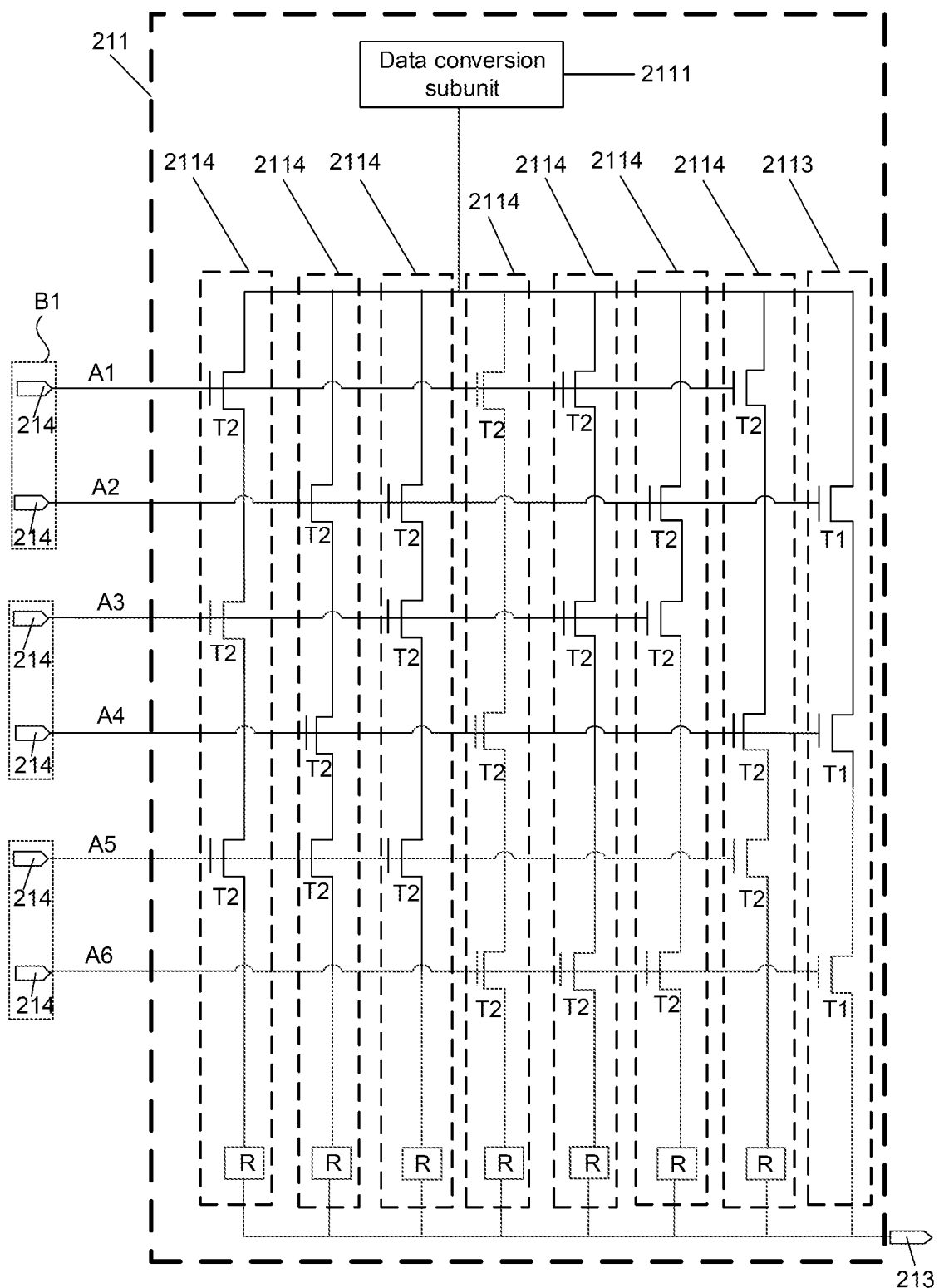
FIG. 8B is a schematic diagram showing a structure of another source driving circuit, according to some embodiments.

In some other embodiments, as shown in FIGS. 8A and 8B, the at least two control terminals 214 includes 2N control terminals 214, and N is an integer greater than or equal to two. The 2N control terminals 214 are divided into N groups of control terminals (a group of control terminals 214 is shown in a dotted frame B1 in FIGS. 8A and 8B), and each group of control terminals includes 2 control terminals. The impedance adjustment circuit 2112 includes a first impedance adjustment sub-circuit 2113 and $(2^N-1)$ second impedance adjustment sub-circuits 2114, and different second impedance adjustment sub-circuits 2114 correspond to different second output impedances. The $(2^N-1)$ second impedance adjustment sub-circuits 2114, for example, are arranged in parallel with the first impedance adjustment sub-circuit 2113.

As shown in FIGS. 8A and 8B, the first impedance adjustment sub-circuit 2113 is connected to the data conversion circuit 2111, the data output terminal 213, and one control terminal 214 of each group of control terminals 214 in the N groups of control terminals 214. The first impedance adjustment sub-circuit 2113 is configured to in response to the first control signal, transmit the converted data signal output by the data conversion circuit 2111 to the data output terminal 213, so that the output impedance of the source driving circuit 211 is the first output impedance Z1.

Each second impedance adjustment sub-circuit 2114 is connected to the data conversion circuit 2111, the data output terminal 213, and one control terminal 214 of each group of control terminals 214 in the N groups of control terminals 214. In the first impedance adjustment sub-circuit 2113 and the $(2^N-1)$ second impedance adjustment sub-circuits 2114, control terminals 214 connected to any two impedance adjustment sub-circuits are not completely the same.

One of the $(2^N-1)$ second impedance adjustment sub-circuits 2114 is configured to, in response to one of the at least one second control signal, transmit the converted data signal output by the data conversion circuit 2111 to the data output terminal 213, so that the output impedance of the source driving circuit 211 is a corresponding second output impedance.

It will be noted that, each second impedance adjustment sub-circuit 2114 corresponds to a second control signal and a different second output impedance. In a case where any one of the $(2^N-1)$ second impedance adjustment sub-circuits 2114 is turned on, the output impedance of the source driving circuit 211 is the second output impedance corresponding to the turned-on second impedance adjustment sub-circuit 2114. In this way, according to a desired second output impedance, the second impedance adjustment sub-circuit 2114 corresponding to the desired second output impedance may be turned on by outputting a corresponding second control signal to the at least two control terminals 214.

In some embodiments, as shown in FIG. 8A, N is equal to two and there are four control terminals 214, i.e., a first control terminal A1, a second control terminal A2, a third control terminal A3 and a fourth control terminal A4. The first control terminal A1 and the second control terminal A2 belong to a group of control terminals 214, and the third control terminal A3 and the fourth control terminal A4 belong to another group of control terminals 214.

The impedance adjustment circuit 2112 includes first impedance adjustment sub-circuit 2113 and three second impedance adjustment sub-circuits 2114. The first impedance adjustment sub-circuit 2113 is connected to the second control terminal A2 and the fourth control terminal A4. The second impedance adjustment sub-circuit 2114 on the left is connected to the first control terminal A1 and the third control terminal A3, the second impedance adjustment sub-circuit 2114 in the middle is connected to the second control terminal A2 and the third control terminal A3, and the second impedance adjustment sub-circuit 2114 on the right is connected to the first control terminal A1 and the fourth control terminal A4.

In some other embodiments, as shown in FIG. 8B, N is equal to three and there are six control terminals 214, i.e., the first control terminal A1, the second control terminal A2, the third control terminal A3, the fourth control terminal A4, the fifth control terminal A5 and the sixth control terminal A6. The first control terminal A1 and the second control terminal A2 belong to a group of control terminals 214, the third control terminal A3 and the fourth control terminal A4 belong to another group of control terminals 214, and the fifth control terminal A5 and the sixth control terminal A6 belong to yet another group of control terminals 214.

The impedance adjustment circuit 2112 includes a first impedance adjustment sub-circuit 2113 and seven second impedance adjustment sub-circuits 2114. The first impedance adjustment sub-circuit 2113 is connected to the second control terminal A2, the fourth control terminal A4, and the sixth control terminal A6. From left to right of FIG. 8B, the 1st second impedance adjustment sub-circuit 2114 is connected to the first control terminal A1, the third control terminal A3, and the fifth control terminal A5; the 2nd second impedance adjustment sub-circuit 2114 is connected to the second control terminal A2, the fourth control terminal A4 and the fifth control terminal A5; the 3rd second impedance adjustment sub-circuit 2114 is connected to the second control terminal A2, the third control terminal A3 and the fifth control terminal A5: the 4th second impedance adjustment sub-circuit 2114 is connected to the first control terminal A1, the fourth control terminal A4 and the sixth control terminal A6; the 5th second impedance adjustment sub-circuit 2114 is connected to the first control terminal A1, the third control terminal A3 and the sixth control terminal A6; the 6th second impedance adjustment sub-circuit 2114 is connected to the second control terminal A2, the third control terminal A3 and the sixth control terminal A6; and the 7th second impedance adjustment sub-circuit 2114 is connected to the first control terminal A1, the fourth control terminal A4 and the fifth control terminal A5.

Since each second impedance adjustment sub-circuit 2114 corresponds to a second output impedance with a different value, the impedance adjustment circuit 2112 including the plurality of second impedance adjustment sub-circuits 2114 may achieve more accurate adjustment to the output impedance of the source driving circuit 211, which contributes to a better display effect of the liquid crystal display panel 1.

In addition, the source driving circuit 211 including the plurality of second impedance adjustment sub-circuits 2114 may enable the source driver 21 applicable to different types or models of liquid crystal display panels.

In some embodiments, as shown in FIGS. 8A and 8B, the first impedance adjustment sub-circuit 2113 includes N first switching transistors T1 connected in series. A gate of each first switching transistor T1 is connected to a control terminal 214 in a corresponding group of control terminals 214. The N first switching transistors T1 are connected to the data conversion circuit 2111 and the data output terminal 213.

For example, the N first switching transistors T1 are sequentially numbered 1st to Nth first switching transistors T1. In this case, a first electrode of the 1st first switching transistor T1 is connected to the data conversion circuit 2111, and a second electrode of the Nth first switching transistor T1 is connected to the data output terminal 213.

In some embodiments, the first switching transistors T1 are P-type TFTs, the first electrode of the first switching transistor T1 is a source, and the second electrode of the first switching transistor T1 is a drain. In this case, the source of the 1st first switching transistor T1 is connected to the data conversion circuit 2111, and the drain of the 1st first switching transistor T1 is connected to the source of the 2nd first switching transistor T1. Similarly, the drain of the Nth first switching transistor T1 is connected to the data output terminal 213.

In some other embodiments, the first switching transistors T1 are N-type TFTs, the first electrode of the first switching transistor T1 is the drain, and the second electrode of the first switching transistor T1 is the source. In this case, the drain of the 1st first switching transistor T1 is connected to the data conversion circuit 2111, and the source of the 1st first switching transistor T1 is connected to the drain of the 2nd first switching transistor T1. Similarly, the source of the Nth first switching transistor T1 is connected to the data output terminal 213.

It will be noted that although FIGS. 8A and 8B show the first switching transistors T1 of N-type, the first switching transistors T1 may be of other types.

In some embodiments, as shown in FIGS. 8A and 8B, each second impedance adjustment sub-circuit 2114 includes N second switching transistors T2 and a resistor R connected in series. A gate of the second switching transistor T2 is connected to a control terminal 214 in a corresponding group of control terminals. The N second switching transistors T2 are connected to the data conversion circuit 2111 and the data output terminal 213. Resistance values of the resistors R in any two second impedance adjustment sub-circuits 2114 may be different.

For example, the N second switching transistors T2 are sequentially numbered 1st to Nth second switching transistors T2. In this case, a first electrode of the 1st second switching transistor T2 is connected to the data conversion circuit 2111. One terminal of the resistor R is connected to the second electrode of the Nth second switching transistor T2, and another terminal of the resistor R is connected to the data output terminal 213.

For example, N is equal to 2, the resistors R in the three second impedance adjustment sub-circuits 2114 are referred to R1, R2, and R3, and resistance values of R1, R2, and R3 are different from each other. For another example, N is equal to 3, the resistors R in the seven second impedance adjustment sub-circuits 2114 are referred to R1, R2, R3, R4, R5, R6 and R7, and resistance values of R1, R2, R3, R4, R5, R6 and R7 are different from each other.

In some embodiments, each resistor R is a single resistor. In some other embodiments, each resistor R is an equivalent resistor composed of multiple resistors that are connected in series and/or in parallel.

In some embodiments, the second switching transistors T2 are P-type TFTs, the first electrode of the second switching transistor T2 is a source, and the second electrode of the second switching transistor T2 is a drain. In this case, the source of the 1st second switching transistor T2 is connected to the data conversion circuit 2111, and the drain of the 1st second switching transistor T2 is connected to the source of the 2nd second switching, transistor T2. Similarly, the drain of the Nth second switching transistor T2 is connected to the resistor R.

In some other embodiments, the second switching transistors T2 are N-type TFTs, the first electrode of the second switching transistor T2 is the drain, and the second electrode of the second switching transistor T2 is the source. In this case, the drain of the 1st second switching transistor T2 is connected to the data conversion circuit 2111, and the source of the 1st second switching transistor T2 is connected to the drain of the 2nd second switching transistor T2. Similarly, the source of the Nth second switching transistor T2 is connected to the resistor R.

In some embodiments, with regard to the control signal from the control terminal 214, "1" represents a high level and "0" represents a low level. As shown in FIGS. 8A and 8B, the first switching transistor T1 and the second switching transistor T2 are turned on when the control signals received are at the high level "1", and are turned off when the control signals received are at the low level "0".

It will be understood that the first impedance adjustment sub-circuit 2113 only includes wires and the first switching transistors T1, so impedance of the first impedance adjustment sub-circuit 2113 is impedance of wires and the first switching transistors T1, and is relatively small. The first output impedance may be considered to be equal to an initial output impedance of the source driving circuit 211. Impedance of each second impedance adjustment sub-circuit 2114 is equal to a sum of impedances of the wires, the second switching transistors T2 and the resistor R included in the second impedance adjustment sub-circuit 2114.

Here, the sum of impedances of the wires and the second switching transistors T2 is a certain value. If each second impedance adjustment sub-circuit 2114 is provided with a resistor having a different resistance value, the impedance of the second impedance adjustment sub-circuit 2114 is different, and thus the second output impedance corresponding to the second impedance adjustment sub-circuit 2114 is different.

Figure 9A:
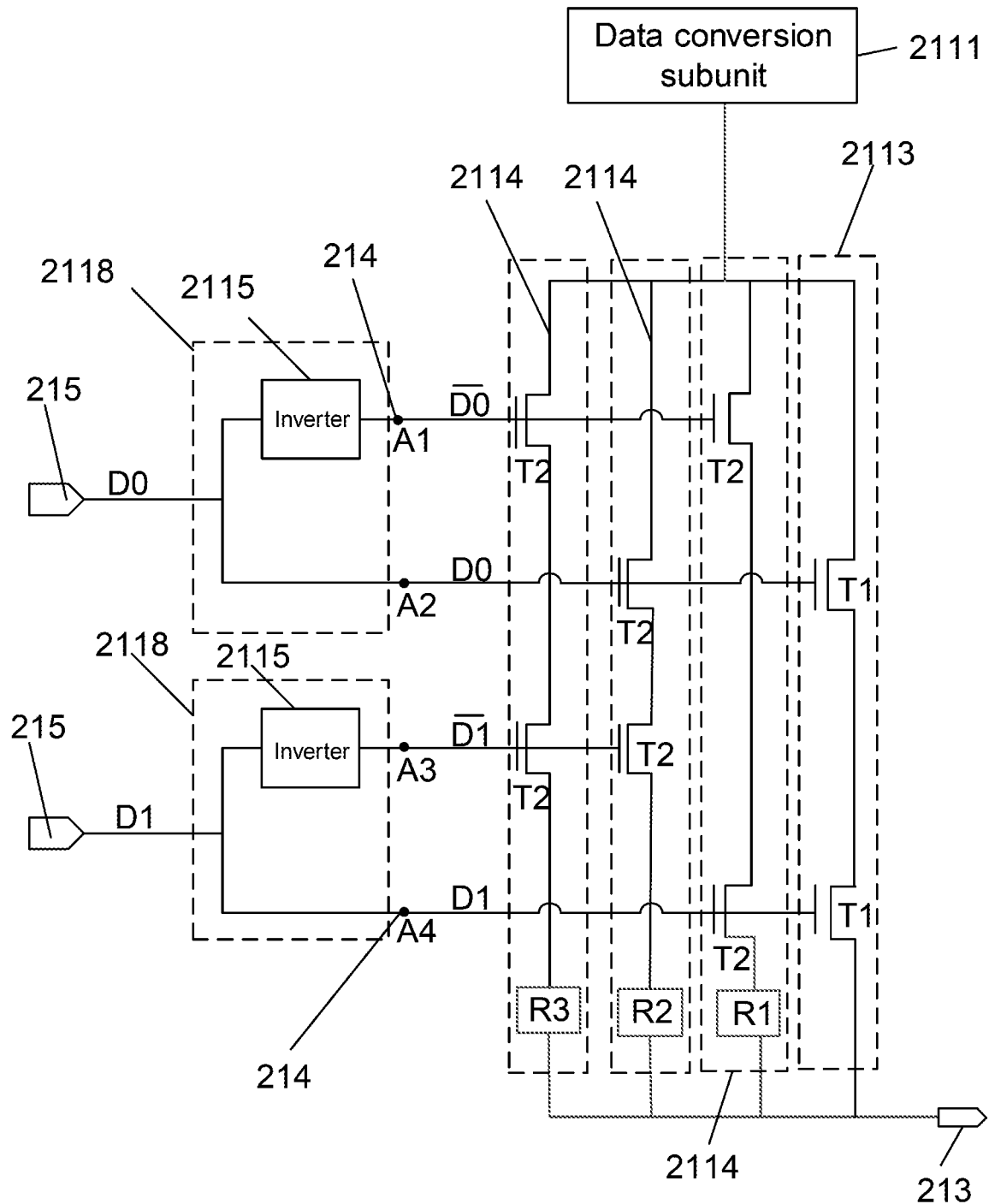
FIG. 9A is a schematic diagram showing a partial structure of a source driver, according to some embodiments.
Figure 9B:
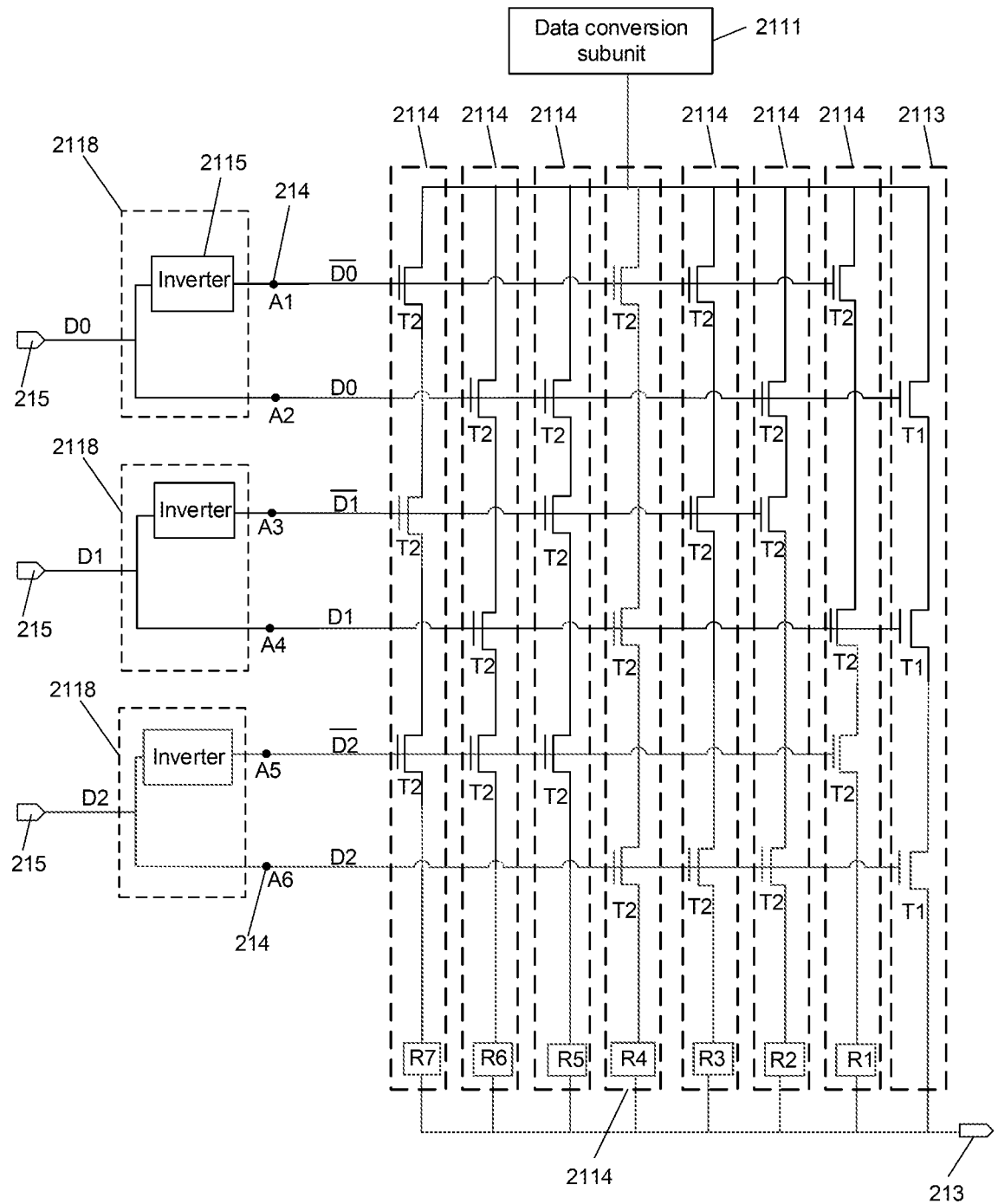
FIG. 9B is a schematic diagram showing a partial structure of another source driver, according to some embodiments.

In some embodiments, as shown in FIGS. 9A and 9B, the source driving circuit 211 further includes N control signal conversion units 2118 and N control signal input terminals 215. Each control signal conversion unit 2118 is connected to a respective one of the N groups of control terminals 214 and a respective one of the N control signal input terminals 215.

Each control signal conversion unit 2118 includes an inverter 2115. One terminal of the inverter 2115 is connected to a corresponding control signal input terminal 215, and another terminal of the inverter 2115 is connected to a control terminal 214 of a corresponding group of control terminals 214. Another control terminal 214 of the corresponding group of control terminals 214 is directly connected to the corresponding control signal input terminal 215.

The inverter 2115 is configured to convert a control signal from the control signal input terminal 215. For example, when the control signal input terminal 215 provides a binary data signal "1" (which may correspond to the high level), the inverter 2115 converts the binary data signal "1" into a binary data signal "0". For another example, when the control signal input terminal 215 provides the binary data signal "0", the inverter 2115 converts the binary data signal "0" into the binary data signal "1".

For example, all control signal input terminals 215 are connected to the timing controller 22. In this case, all the control terminals 214 are indirectly connected to the timing controller 22.

Since the control signal conversion units 2118 are provided, the number of the control signal input terminals 215 may be half of the number of the control terminals 214, which may reduce the number of ports of the source driver.

For example, as shown in FIG. 9A, N is equal to 2. That is, the source driving circuit 211 includes two control signal conversion units 2118 and two control signal input terminals 215. Binary data signals D0 and D1 are input to the two control signal input terminals 215. For one control signal conversion unit 2118, a data signal transmitted to the second control terminal A2 that is directly connected to the control signal input terminal 215 is D0, and a data signal transmitted to the first control terminal A1 that is connected to the inverter 2115 is $\overline{D0}$. For another control signal conversion unit 2118, a data signal transmitted to the fourth control terminal A4 that is directly connected to another control signal input terminal 215 is D1, and a data signal transmitted to the third control terminal A3 that is connected to the inverter 2115 is $\overline{D1}$.

On this basis, in a case where D0 and D1 are both data signals "1", control signals of the first control terminal A1, the second control terminal A2, the third control terminal A3 and the fourth control terminal A4 are 0, 1, 0 and 1, respectively. In this case, the impedance adjustment circuit 2112 receives a first control signal denoted as 0101. As a result, the first impedance adjustment sub-circuit 2113 is turned on, and the second impedance adjustment sub-circuits 2113 are in an off state.

In another case where D0 is a data signal "0" and D1 is a data signal "1", control signals of the first control terminal A1, the second control terminal A2, the third control terminal A3 and the fourth control terminal A4 are 1, 0, 0 and 1, respectively. In this case, the impedance adjustment circuit 2112 receives a second control signal denoted as 1001. As a result, the second impedance adjustment sub-circuit 2114 on the right is turned on, and other impedance adjustment sub-circuits are in the off state.

In yet another case where D0 is a data signal "1" and D1 is a data signal "0", control signals of the first control terminal A1 the second control terminal A2, the third control terminal A3 and the fourth control terminal A4 are 0, 1, 1 and 0, respectively. In this case, the impedance adjustment circuit 2112 receives a second control signal denoted as 0110. As a result, the second impedance adjustment sub-circuit 2114 in the middle is turned on, and other impedance adjustment sub-circuits are in the off state.

In yet another case where D0 and D1 are both data signals "0", control signals of the first control terminal A1 the second control terminal A2, the third control terminal A3 and the fourth control terminal A4 are 1, 0, 1 and 0, respectively. In this case, the impedance adjustment circuit 2112 receives a second control signal denoted as 1010. As a result, the second impedance adjustment sub-circuit 2114 on the left is turned on, and other impedance adjustment sub-circuits are in the off state.

For another example, as shown in FIG. 9B, N is equal to 3. That is, the source driving circuit 211 includes three control signal conversion units 2118 and three control signal input terminals 215. Binary data signals D0, D1 and D2 are input to the three control signal input terminals 215. For a first one of the three control signal conversion units 2118, a data signal transmitted to the second control terminal A2 that is directly connected to the control signal input terminal 215 is D0, and a data signal transmitted to the first control terminal A1 connected to the inverter 2115 is $\overline{D0}$. For a second one in the three control signal conversion units 2118, a data signal transmitted to the fourth control terminal A4 that is directly connected to the control signal input terminal 215 is D1, and a data signal transmitted to the third control terminal A3 that is connected to the inverter 2115 is $\overline{D1}$. For a third one in the three control signal conversion units 2118, a data signal transmitted to the sixth control terminal A6 that is directly connected to the control signal input terminal 215 is D2, and a data signal transmitted to the fifth control terminal A5 that is connected to the inverter 2115 is $\overline{D2}$.

On this basis, in a case where D0, D1, and D2 are all data signals "1", control signals transmitted to the first control terminal A1, the second control terminal A2, the third control terminal A3, the fourth control terminal A4, the fifth control terminal A5, and the sixth control terminal A6 are 0, 1, 0, 1, 0 and 1, respectively. In this case, the impedance adjustment circuit 2112 receives a first control signal denoted as 010101. As a result, the first impedance adjustment sub-circuit 2113 is turned on, and other impedance adjustment sub-circuits are in the off state.

In another case where D0, D1 and D2 are data signals "0", "1" and "0" respectively, control signals transmitted to the first control terminal A1, the second control terminal A2, the third control terminal A3, the fourth control terminal A4, the fifth control terminal A5, and the sixth control terminal A6 are 1, 0, 0, 1, 1 and 0, respectively. In this case, the impedance adjustment circuit 2112 receives a second control signal denoted as 100110. From left to right in FIG. 9B, the 7th second impedance adjustment sub-circuit 2114 (which includes the resistor R1) is turned on, and other impedance adjustment sub-circuits are in the off state.

In yet another case where D0, D1 and D2 are data signals "1", "0" and "1" respectively, control signals transmitted to the first control terminal A1, the second control terminal A2, the third control terminal A3, the fourth control terminal A4, the fifth control terminal A5 and the sixth control terminal A6 are 0, 1, 1, 0, 0 and 1, respectively. In this case, the impedance adjustment circuit 2112 receives a second control signal denoted as 011001, the 6th second impedance adjustment sub-circuit 2114 (which includes the resistor R2) is turned on, and other impedance adjustment sub-circuits are in the off state.

In yet another case where D0, D1, and D2 are data signals "0", "0", and "1", respectively, control signals transmitted to the first control terminal A1, the second control terminal A2, the third control terminal A3, the fourth control terminal A4, the fifth control terminal A5, and the sixth control terminal A6 are 1, 0, 1, 0, 0 and 1, respectively. In this case, the impedance adjustment circuit 2112 receives a second control signal denoted as 101001, the 5th second impedance adjustment sub-circuit 2114 (which includes the resistor R3) is turned on, and other impedance adjustment sub-circuits are in the off state.

In yet another case where D0, D1 and D2 are data signals "0", "1" and "1" respectively, control signals transmitted to the first control terminal A1, the second control terminal A2, the third control terminal A3, the fourth control terminal A4, the fifth control terminal A5 and the sixth control terminal A6 are 1, 0, 0, 1, 0 and 1, respectively. In this case, the impedance adjustment circuit 2112 receives a second control signal denoted as 100101, the 4th second impedance adjustment sub-circuit 2114 (which includes the resistor R4) is turned on, and other impedance adjustment sub-circuits are in the off state.

In yet another case where D0, D1 and 02 are data signals "1", "0" and "0" respectively, control signals transmitted to the first control terminal A1, the second control terminal A2, the third control terminal A3, the fourth control terminal A4, the fifth control terminal A5, and the sixth control terminal A6 are 0, 1, 1, 0, 1 and 0, respectively. In this case, the impedance adjustment circuit 2112 receives a second control signal denoted as 011010, the 3rd second impedance adjustment sub-circuit 2114 (which includes the resistor R5) is turned on, and other impedance adjustment sub-circuits are in the off state.

In a case where D0, D1 and 02 are data signals "1", "1" and "0" respectively, control signals transmitted to the first control terminal A1, the second control terminal A2, the third control terminal A3, the fourth control terminal A4, the fifth control terminal A5 and the sixth control terminal A6 are 0, 1, 0, 1, 1 and 0, respectively. In this case, the impedance adjustment circuit 2112 receives a second control signal denoted as 010110, the 2nd second impedance adjustment sub-circuit 2114 (which includes the resistor R6) is turned on, and other impedance adjustment sub-circuits are in the off state.

In yet another case where D0, D1 and D2 are both data signals "0", control signals transmitted to the first control terminal A1, the second control terminal A2, the third control terminal A3, the fourth control terminal A4, the fifth control terminal A5 and the sixth control terminal A6 are 1, 0, 1, 0, 1 and 0, respectively. In this case, the impedance adjustment circuit 2112 receives a second control signal denoted as 101010, the 1st second impedance adjustment sub-circuit 2114 (which includes the resistor R7) is turned on, and other impedance adjustment sub-circuits are in the off state.

Figure 10:
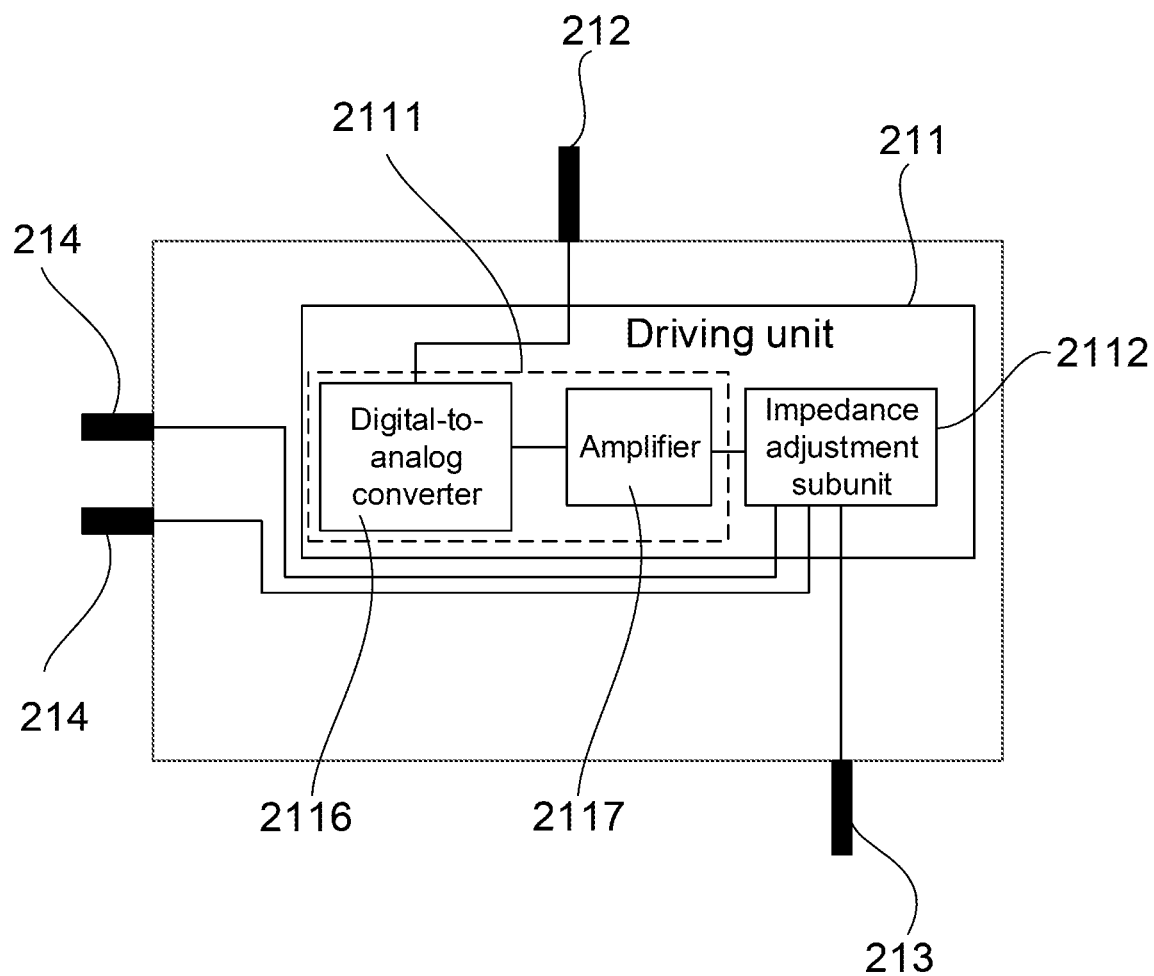
FIG. 10 is a schematic diagram of another source driving circuit, according to some embodiments.

In some embodiments, as shown in FIG. 10, the data conversion circuit 2111 includes a digital-to-analog converter 2116 and an amplifier 2117. The digital-to-analog converter 2116 is connected to the data input terminal 212 and the amplifier 2117. The amplifier 2117 is connected to the impedance adjustment circuit 2112. The digital-to-analog converter 2116 is configured to convert the format of the data signal from the data input terminal 212, for example, convert a digital signal into an analog voltage signal. The amplifier 2117 is configured to amplify the analog voltage signal, and transmit the amplified analog voltage signal to the impedance adjustment circuit 2112.

A relationship between an input and an output of the digital-to-analog converter 2116 coincides with a gamma correction characteristic curve, which represents a corresponding relationship between gray scales and driving voltages. It will be noted that an analog voltage signal output by the digital-to-analog converter 2116 is amplified by the amplifier 2117, which may facilitate the signal transmission on the data line 16 and improve the stability of the transmission.

Figure 11:
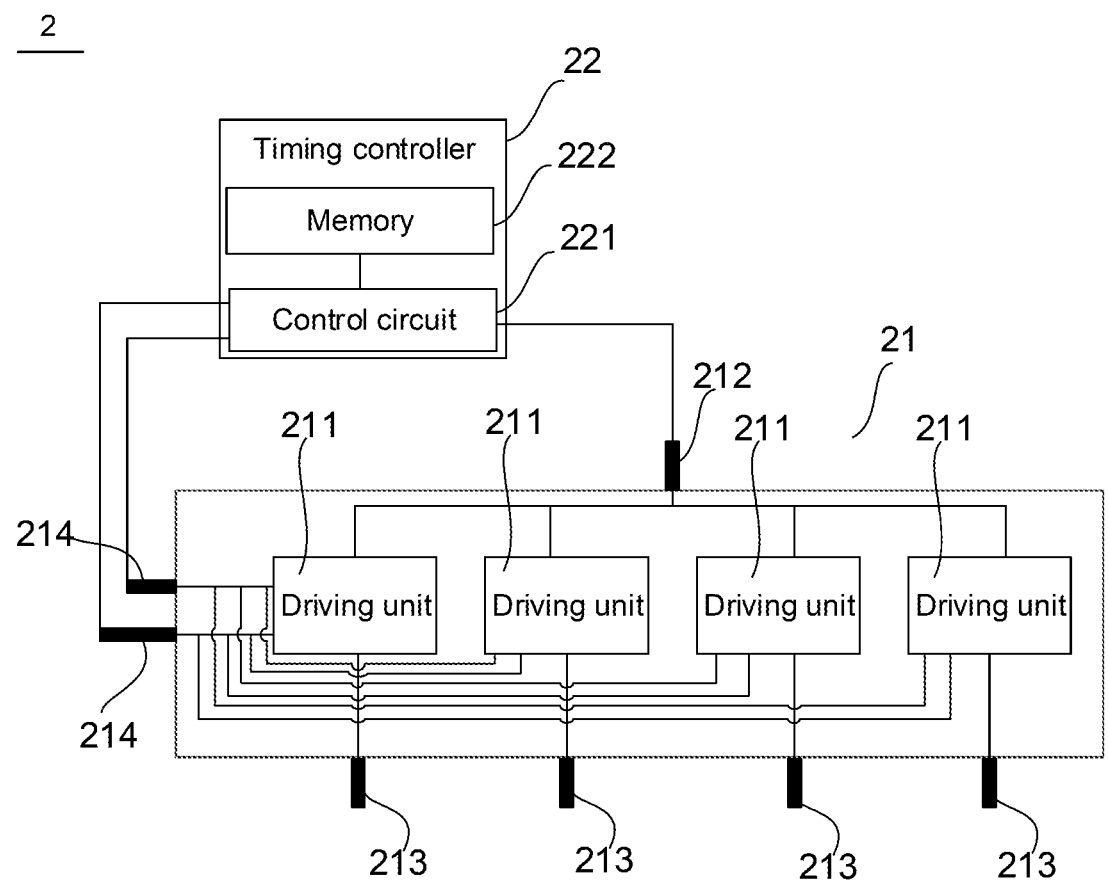
FIG. 11 is a schematic diagram of a driving system, according to some embodiments.

In some embodiments, as shown in FIG. 11 the timing controller 22 includes a control circuit 221. The control circuit 221 is connected to the at least one data input terminal 212 and the at least two control terminals 214 of each source driver 21.

The control circuit 221 is configured to: output the data signal to the at least one data input terminal 212; and output the control signal to the at least two control terminals 214 according to the PWM signal.

For example, in a case where the PWM signal is at a high level, the control circuit 221 is configured to output the first control signal to the at least two control terminals 214 to enable the first impedance adjustment sub-circuit 2113 to be turned on. Alternatively, in a case where the PWM signal is at a low level, the control circuit 221 is configured to output the one of the at least one second control signal to the at least two control terminals 214 to enable the one of the ($2^N-1$) second impedance adjustment sub-circuits 2114 to be turned on.

In some examples, the control circuit 221 can be implemented in a special purpose processor such as an application specific integrated circuit (ASIC); an electronic circuit; a combinational logic circuit; a field programmable gate array (FPGA); a processor (shared, dedicated, or group) that executes code; other suitable hardware components that provide the described functionality.

In some embodiments, as shown in FIG. 11, the timing controller 22 further includes a memory 222 that is connected to the control circuit 221. The memory 222 is configured to store a data signal and the different control signals. The different control signals include the first control signal and the at least one second control signal.

In this case, the control circuit 221 is further configured to: retrieve the data signal from the memory 222; in response to the PWM signal that is at the high level, retrieve the first control signal from the memory 222 and output the first control signal to the at least two control terminals 214; and in response to the PWM signal that is at the low level, retrieve one of the at least one second control signal from the memory 222 and output the one of the at least one second control signal to the at least two control terminals 214.

In some embodiments, the memory 222 is further configured to store at least one corresponding relationship between luminance of the backlight module 3 and the at least one second control signal.

In the case where the PWM signal is at the low level, the control circuit 221 is configured to: obtain the luminance of the backlight module 3 corresponding to the PWM signal; retrieve a second control signal from the memory 222 according to the at least one corresponding relationship and the luminance of the backlight module 3; and output the second control signal to the at least two control terminals 214.

For example, there are corresponding relationships between the luminance of the backlight module 3 and the PWM signal received by the backlight module 3. The corresponding relationships may be stored in a memory (for example, the memory 222), and the control circuit 221 can retrieve a corresponding relationship between a luminance and a PWM signal, and then obtain the luminance of the backlight module 3 according to the corresponding relationship and the PWM signal.

The corresponding relationship between the luminance of the backlight module 3 and the at least one second control signal may be obtained through experiments. For example, a duty ratio of the high voltage of the PWM signal is adjusted to change the luminance of the backlight module 3. Then, for certain luminance of the backlight module 3, different second control signals are input to the source driving circuit 211, and the display image of the liquid crystal display panel 1 is observed. If a second control signal input to the source driving circuit 211 results in no waterfall defects appearing on the liquid crystal display panel 1, then this second control signal is selected to be the second control signal corresponding to the luminance of the backlight module 3.

It will be noted that, the memory 222 may be a read-only memory (ROM) or other types of static storage devices capable of storing static information and instructions, a random access memory (RAM) or other types of dynamic storage devices capable of storing information and instructions. The memory 222 may also be an electrically erasable programmable read-only memory (EEPROM), a compact disc read-only memory (CD-ROM) or other optical disk storages, optical disc storages (including compact disc, laser disc, optical disc, digital versatile optical disc, Blu-ray disc, etc.), magnetic disk storage media or other magnetic storage devices, or any other media that can be used to carry or store desired program codes in form of instructions or data structures and can be accessed by the control circuit 221.

In some embodiments, the source driving circuit 211 includes the data conversion circuit 2111 and the impedance adjustment circuit 2112, and the impedance adjustment circuit 2112 includes a first impedance adjustment sub-circuit 2113 and ($2^N$–1) second impedance adjustment sub-circuits 2114.

In the case where the PWM signal is at the high level, the control circuit 221 is further configured to: output the first control signal to the 2N control terminals 214 to enable the first impedance adjustment sub-circuit 2113 to be turned on, so that the output impedance of the source driving circuit 211 is the first output impedance Z1.

In the case where the PWM signal is at the low level, the control circuit 221 is further configured to: output one of the at least one second control signal to the 2N control terminals 214 to enable a corresponding one of the ($2^N$–1) second impedance adjustment sub-circuits 2114 to be turned on, so that the output impedance of the source driving circuit 211 is the second output impedance Z2 corresponding to the turned-on second impedance adjustment sub-circuit 2114.

Figure 12:
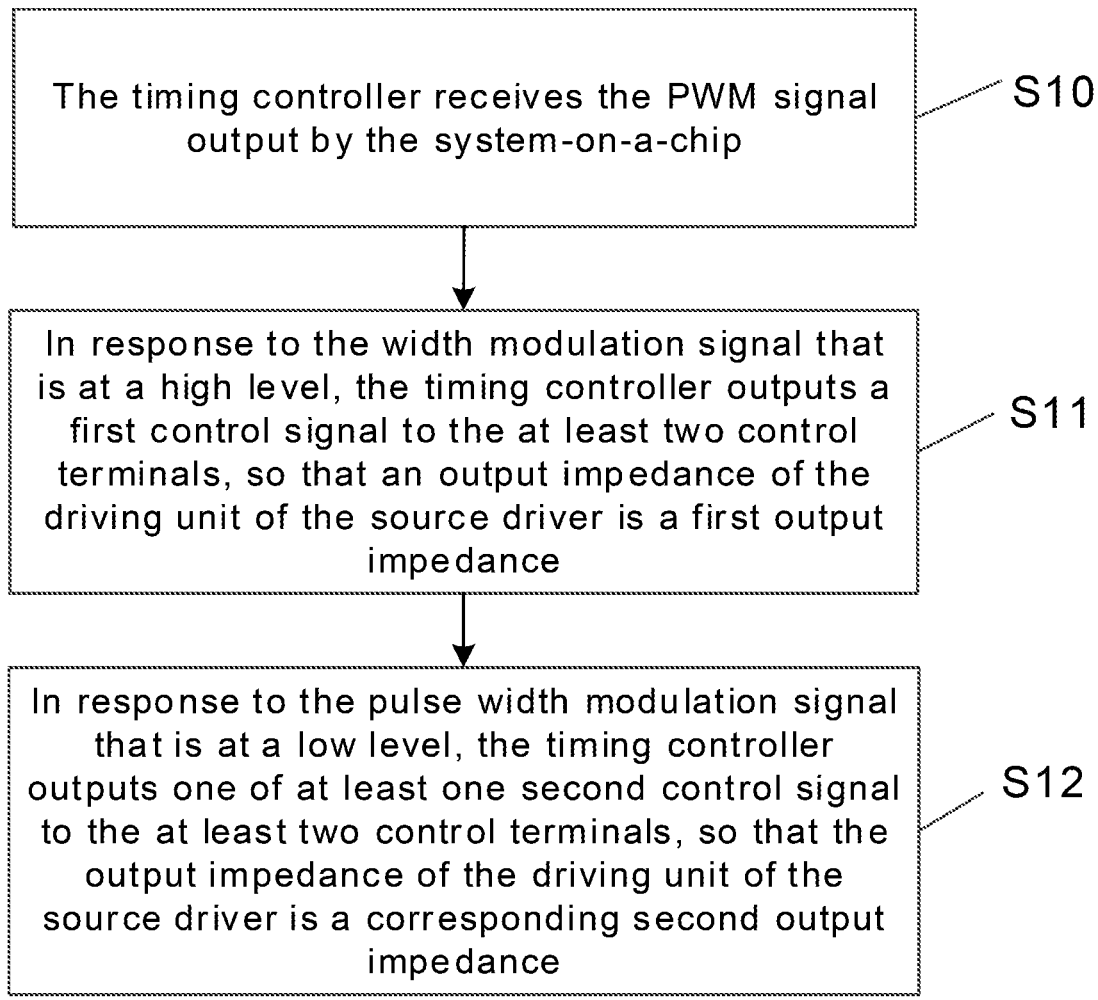
FIG. 12 is a flow diagram of a correction method for the liquid crystal display device, according to some embodiments.

As shown in FIGS. 3C, 7 and 12, some embodiments of the present disclosure provide a correction method for the liquid crystal display device, and the correction method includes S10 to S12.

In S10, the timing controller 22 obtains the PWM signal output by the system-on-a-chip 8.

In S11, the timing controller 22 outputs the first control signal to the at least two control terminals 214 in response to the PWM signal that is at the high level, so that the output impedance of the source driving circuit 211 of the source driver 21 is the first output impedance.

In S13, the timing controller 22 outputs one of the at least one second control signal to the at least two control terminals 214 in response to the PWM that is at the low level, so that the output impedance of the source driving circuit 211 of the source driver 21 is a corresponding second output impedance.

The correction method for the liquid crystal display device has same beneficial effects as the source driver 21, and details will not be repeated herein again.

In some embodiments, the impedance adjustment circuit 2112 in the source driver 21 includes the first impedance adjustment sub-circuit 2113 and the ($2^N$–1) second impedance adjustment sub-circuits 2114. With regard to structures of the first impedance adjustment sub-circuit 2113 and the second impedance adjustment sub-circuit 2114, reference may be made to the above related descriptions details will not be repeated herein again.

On this basis, the step of outputting, by the timing controller 22, the first control signal to the at least two control terminals 214 in response to the PWM signal that is at the high level, includes: outputting, by the timing controller 22, the first control signal to the 2N control terminals 214 in response to the PWM signal that is at the high level, so as to enable the first impedance adjustment sub-circuit 2113 to be turned on.

The step of outputting, by the timing controller 22, the second control signal to the at least two control terminals 214 in response to the PWM signal that is at the low level, so that the output impedance of the source driving circuit 211 of the source driver 21 is a corresponding second output impedance, includes: obtaining, by the timing controller 22, the luminance of the backlight modules 3 according to the PWM signal; outputting, by the timing controller 22, a second control signal corresponding to the luminance of the backlight modules 3 to the 2N control terminals 214 to enable a corresponding one of the ($2^N$–1) second impedance adjustment sub-circuits 2114 to be turned on, so that the output impedance of the source driving circuit 211 is a second output impedance Z1 corresponding to the turned-on second impedance adjustment sub-circuit 2114.

In some embodiments, the first impedance adjustment sub-circuit 2113 includes N first switching transistors T1 connected in series, and the second impedance adjustment sub-circuit 2114 includes N second switching transistors T2 connected in series.

On this basis, the step of outputting, by the timing controller 22, the first control signal to the 2N control terminals 214 in response to the PWM signal that is at the high level, so as to enable the first impedance adjustment sub-circuit 2113 to be turned on, includes: outputting, by the timing controller 22, the first control signal to the 2N control terminals 214 in response to the PWM signal that is at the high level, so as to turn on the N first switching transistors T1 in the first impedance adjustment sub-circuit 2113.

The step of outputting, by the timing controller 22, the second control signal corresponding to the luminance of the backlight module 3 to the 2N control terminals 214 in response to the PWM signal that is at the low level, so as to make the one of the ($2^N$–1) second impedance adjustment sub-circuits 2114 to be turned on, includes: outputting, by the timing controller 22, the second control signal corresponding to the luminance of the backlight module 3 to the 2N control terminals 214, so as to turn on the N second switching transistors T2 in the one of the ($2^N$–1) second impedance adjustment sub-circuits 2114.

For example, with reference to the source driving circuit 211 shown in FIG. 8B, if the first control signal is "010101", the first impedance adjustment sub-circuit is turned on. In an order from left to right in FIG. 8B, the second control signals that make the seven second impedance adjustment sub-circuits 2114 be turned on are "101010", "010110", "011010", "100101", "101001", "011001" and "100110". The Resistance value of each resistor R in the seven second impedance adjustment sub-circuits 2114 may be set based on, for example, experience or experiments.

A person of ordinary skill in the art will understand that, all or part of the steps in the above method embodiments may be implemented by using hardware related to program instructions. The program instructions may be stored in a non-transient computer readable storage medium for performing the steps included in the above embodiments. The storage medium includes various media capable of storing program codes, such as a read-only memory (ROM), a random-access memory (RAM), a magnetic disk, or an optical disk.

The forgoing descriptions are merely specific implementations of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A source driver, comprising:
   at least one data input terminal;
   a plurality of data output terminals; and
   at least two control terminals; and
   a plurality of source driving circuits, each source driving circuit being connected to a data input terminal of the at least one data input terminal, a data output terminal of the plurality of data output terminals and the at least two control terminals, wherein
   the source driving circuit is configured such that:
      the source driving circuit converts a format of a data signal from the data input terminal, and
      in response to one of different control signals that is received by the control terminals, the source driving circuit has a corresponding different output impedance, and transmits the converted data signal to the data output terminal;
   wherein the plurality of different control signals include a first control signal and at least one second control signal, and the source driving circuit is configured such that:
      in response to the first control signal, the source driving circuit has a first output impedance; and
      in response to one of the at least one second control signal, the source driving circuit has a second output impedance greater than the first output impedance;
   wherein the source driving circuit includes:
   a data conversion circuit connected to the data input terminal, the data conversion circuit being configured to convert the format of the data signal, and transmit the converted data signal to an impedance adjustment circuit; and
   the impedance adjustment circuit connected to the data conversion circuit, the at least two control terminals and the data output terminal, the impedance adjustment circuit being configured such that:
      in response to the first control signal, the impedance adjustment circuit has the first output impedance, and transmits the converted data signal to the data output terminal; and
      in response to the second control signal, the impedance adjustment circuit has the second output impedance, and transmits the converted data signal to the data output terminal;
   wherein the at least two control terminals include 2N control terminals, the 2N control terminals are divided into N groups of control terminals, each group of control terminals includes two control terminals, and N is an integer that is greater than or equal to two; and
   the impedance adjustment circuit includes:
      a first impedance adjustment sub-circuit connected to the data conversion circuit, the data output terminal, and one control terminal of each group of control terminals; the first impedance adjustment sub-circuit being configured to, in response to the first control signal, transmit the converted data signal from the data conversion circuit to the data output terminal, so that an output impedance of the source driving circuit is the first output impedance; and
      ($2^N$−1) second impedance adjustment sub-circuits corresponding to different second impedances; each second impedance adjustment sub-circuit being connected to the data conversion circuit, the data output terminal, and one control terminal in each group of control terminals, and the second impedance adjustment sub-circuits being configured to, in response to the second control signal, transmit the converted data signal from the data conversion circuit to the data output terminal, so that the output impedance of the source driving circuit is a corresponding second output impedance, wherein
      control terminals connected to any two of the first impedance adjustment sub-circuit and the ($2^N$−1) second impedance adjustment sub-circuits are not completely same control terminals.

2. The source driver according to claim 1, wherein
   the first impedance adjustment sub-circuit includes N first switching transistors connected in series, a gate of each first switching transistor is connected to one control terminal in a corresponding group of control terminals, and the N first switching transistors are connected to the data conversion circuit and the data output terminal; and
   each second impedance adjustment sub-circuit includes N second switching transistors and a resistor that are connected in series; a gate of each second switching transistor is connected to one control terminal in a corresponding group of control terminals, and a first electrode of a first second switching transistor in the N second switching transistors is connected to the data conversion circuit; one terminal of the resistor is connected to a second electrode of an Nth second switching transistor in the N second switching transistors, and another terminal of the resistor is connected to the data output terminal; resistance values of resistors in any two of the N second impedance adjustment sub-circuits are different.

3. The source driver according to claim 1, further comprising:
   N control signal input terminals, and
   N control signal conversion units each including an inverter, wherein
   one terminal of the inverter is connected to a corresponding control signal input terminal, and another terminal of the inverter is connected to a control terminal in a corresponding group of control terminals; and another control terminal of the corresponding group of control terminals is directly connected to the corresponding control signal input terminal.

4. The source driver according to claim 1, wherein the data conversion circuit includes:
   a digital-to-analog converter connected to the data input terminal, the digital-to-analog converter being configured to convert a digital signal from the data input terminal into an analog voltage signal; and an amplifier connected to the digital-to-analog converter and the impedance adjustment circuit, the amplifier being configured to amplify the analog voltage signal, and transmit the amplified analog voltage signal to the impedance adjustment circuit.

5. A driving system, comprising:

at least one source driver according to claim 1; and a timing controller including:
- a control circuit connected to the at least one data input terminal and the at least two control terminals of each source driver, wherein the control circuit is configured to: output the data signal to the at least one data input terminal; and output one of the different control signals to the at least two control terminals according to a pulse width modulation signal;

wherein the control circuit is further configured to:

in response to the pulse width modulation signal that is at a high level, output a first control signal to the at least two control terminals; and in response to the pulse width modulation signal that is at a low level, output one of at least one second control signal to the at least two control terminals;

wherein the at least two control terminals include 2N control terminals; the 2N control terminals are divided into N groups of control terminals, and each group of control terminals includes 2 control terminals, and N is an integer that is greater than or equal to two;

the source driving circuit of the source driver includes a data conversion circuit and an impedance adjustment circuit; the impedance adjustment circuit includes a first impedance adjustment sub-circuit and ($2^N$–1) second impedance adjustment sub-circuits; and the control circuit is configured to:
- in response to the pulse width modulation signal that is at the high level, output the first control signal to the 2N control terminals to enable the first impedance adjustment sub-circuit to be turned on; and
- in response to the pulse width modulation signal that is at the low level, output a second control signal to the 2N control terminals to enable one of the ($2^N$–1) second impedance adjustment sub-circuits to be turned on.

6. The driving system according to claim 5, wherein the timing controller further includes a memory connected to the control circuit; the memory is configured to store the data signal and the different control signals; the different control signals include the first control signal and the at least one second control signal; and the control circuit is further configured to:
- retrieve the data signal from the memory and output the data signal to the at least one data input terminal;
- in response to the pulse width modulation signal that is at the high level, retrieve the first control signal from the memory and output the first control signal to the at least two control terminals; and
- in response to the pulse width modulation signal that is at the low level, retrieve one of the at least one second control signal from the memory and output the one of the at least one second control signal to the at least two control terminals.

7. The driving system according to claim 6, wherein the memory is further configured to store at least one corresponding relationship between luminance of a backlight module and the at least one second control signal; and the control circuit is further configured to, in response to the pulse width modulation signal that is at the low level:
- obtain luminance of the backlight module corresponding to the pulse width modulation signal;
- according to the pulse width modulation signal and the at least one corresponding relationship, retrieve a second control signal corresponding to the luminance of the backlight module from the memory; and
- output the second control signal to the at least two control terminals.

8. A liquid crystal display device, comprising:

the driving system according to claim 5;

a liquid crystal display panel including a plurality of data lines, each data line being connected to a source driving circuit in a source driver of the driving system;

a system-on-a-chip connected to the timing controller of the driving system, wherein
- the system-on-a-chip is configured to output the pulse width modulation signal to the timing controller and a backlight driving circuit of a backlight module; and the backlight module, the backlight module including the backlight driving circuit and at least one light source connected to the backlight driving circuit, wherein
- the backlight driving circuit is connected to the system-on-a-chip, and is configured to: receive the pulse width modulation signal, and drive the at least one light source to emit light according to the pulse width modulation signal.

9. The liquid crystal display device according to claim 8, wherein the at least one source driver in the driving system is disposed in a peripheral area on the liquid crystal display panel; and the liquid crystal display device further comprising:
- a first circuit board, on which the timing controller is disposed; and
- a first flexible circuit board, through which the liquid crystal display panel and the first circuit board are connected.

10. The liquid crystal display device according to claim 8, further comprising:
- a second flexible circuit board, on which the at least one source driver is disposed; and
- a second circuit board, on which the timing controller is disposed; and the liquid crystal display panel and the second circuit board being connected through the second flexible circuit board.

11. A correction method for the liquid crystal display device according to claim 8, the correction method comprising:
- receiving, by the timing controller, the pulse width modulation signal output by the system-on-a-chip;
- in response to the pulse width modulation signal that is at a high level, outputting, by the timing controller, a first control signal to the at least two control terminals, so that an output impedance of the source driving circuit of the source driver is a first output impedance; and
- in response to the pulse width modulation signal that is at a low level, outputting, by the timing controller, one of at least one second control signal to the at least two control terminals, so that the output impedance of the source driving circuit of the source driver is a corresponding second output impedance.

12. The correction method according to claim 11, wherein the source driving circuit of the source driver includes 2N control terminals; the 2N control terminals are divided into N groups of control terminals, and each group of control terminals includes 2 control terminals, and N is an integer that is greater than or equal to two; the source driving circuit of the source driver includes a data conversion circuit and an impedance adjustment circuit; the impedance adjustment circuit includes a first impedance adjustment sub-circuit and $(2^N-1)$ second impedance adjustment sub-circuits; and in response to the pulse width modulation signal that is at the high level, outputting, by the timing controller, the first control signal to the at least two control terminals, includes:

outputting, by the timing controller, the first control signal to the 2N control terminals to enable the first impedance adjustment sub-circuit to be turned on.

13. The correction method according to claim 12, wherein the first impedance adjustment sub-circuit includes N first switching transistors that are connected in series; and outputting, by the timing controller, the first control signal to the 2N control terminals to enable the first impedance adjustment sub-circuit to be turned on, includes:

outputting, by the timing controller, the first control signal to the 2N control terminals to turn on the N first switching transistors in the first impedance adjustment sub-circuit.

14. The correction method according to claim 11, wherein the source driving circuit of the source driver includes 2N control terminals; the 2N control terminals are divided into N groups of control terminals, each group of control terminals includes 2 control terminals, and N is an integer that is greater than or equal to two; the source driving circuit of the source driver includes a data conversion circuit and an impedance adjustment circuit; the impedance adjustment circuit includes a first impedance adjustment sub-circuit and $(2^N-1)$ second impedance adjustment sub-circuits; and in response to the pulse width modulation signal that is at the low level, outputting, by the timing controller, the one of the at least one second control signal to the at least two control terminals, so that the output impedance of the source driving circuit of the source driver is the corresponding second output impedance, includes:

obtaining, by the timing controller, luminance of a backlight module corresponding to the pulse width modulation signal;

outputting, by the timing controller, a second control signal corresponding to the luminance of the backlight module to the 2N control terminals to enable a corresponding one of the $(2^N-1)$ second impedance adjustment sub-circuits to be turned on, so that the output impedance of the source driving circuit is a second output impedance corresponding to the turned-on second impedance adjustment sub-circuit.

15. The correction method according to claim 14, wherein each of the $(2^N-1)$ second impedance adjustment sub-circuits includes N second switching transistors and a resistor that are connected in series; and outputting, by the timing controller, the second control signal corresponding to the luminance of the backlight module to the 2N control terminals to enable the corresponding one of the $(2^N-1)$ second impedance adjustment sub-circuits to be turned on, includes:

outputting, by the timing controller, the second control signal corresponding to the luminance of the backlight module to the 2N control terminals to turn on N second switching transistors in the corresponding one of the $(2^N-1)$ second impedance adjustment sub-circuits.

* * * * *